US007647676B2

(12) United States Patent
Carnevali

(10) Patent No.: US 7,647,676 B2
(45) Date of Patent: Jan. 19, 2010

(54) THUMB RELEASE MOUNTING APPARATUS

(76) Inventor: Jeffrey D. Carnevali, 5957 Beach Dr., SW., Seattle, WA (US) 98136

( * ) Notice: Subject to any disclaimer, the term of this patent is extended or adjusted under 35 U.S.C. 154(b) by 248 days.

(21) Appl. No.: 11/345,590

(22) Filed: Jan. 31, 2006

(65) Prior Publication Data
US 2007/0022582 A1 Feb. 1, 2007

Related U.S. Application Data

(63) Continuation-in-part of application No. 11/243,846, filed on Oct. 5, 2005, which is a continuation-in-part of application No. 11/191,549, filed on Jul. 28, 2005, now Pat. No. 7,571,522.

(51) Int. Cl.
B60R 11/02 (2006.01)
A44B 21/00 (2006.01)
(52) U.S. Cl. .................. 24/523; 379/426; 379/446; 379/455; 248/316.4; 248/309.1
(58) Field of Classification Search .............. 24/3.1, 24/3.7, 3.8, 3.11, 3.12, 522, 523; 224/242, 224/445, 662; 248/188.5, 297.11, 297.31, 248/309.1, 313, 314, 316.1, 316.4; 269/156, 269/165, 254 CS, 254 R; 379/426, 446, 454, 379/455
See application file for complete search history.

(56) References Cited

U.S. PATENT DOCUMENTS

| 2,319,377 | A | | 5/1943 | Wallace et al. |
|---|---|---|---|---|
| 2,733,492 | A | | 2/1956 | Copell |
| 3,509,882 | A | * | 5/1970 | Blake ..................... 606/142 |
| 4,066,231 | A | | 1/1978 | Bahner et al. |
| 4,118,003 | A | | 10/1978 | Dillow |
| 4,798,294 | A | | 1/1989 | Bodi |
| 4,802,708 | A | | 2/1989 | Vos et al. |
| 4,803,759 | A | | 2/1989 | Kemble |
| 4,928,916 | A | | 5/1990 | Molloy |
| 4,957,264 | A | | 9/1990 | Hakanen |
| 4,976,721 | A | | 12/1990 | Blasnik et al. |
| 5,024,408 | A | | 6/1991 | Magee |
| 5,149,032 | A | | 9/1992 | Jones et al. |
| 5,457,745 | A | | 10/1995 | Wang |
| 5,582,377 | A | | 12/1996 | Quesada |
| D377,798 | S | | 2/1997 | Heine |
| 5,653,414 | A | | 8/1997 | Chimel |
| 5,673,628 | A | | 10/1997 | Boos |
| 5,685,732 | A | * | 11/1997 | Lane ..................... 439/369 |
| D390,849 | S | | 2/1998 | Richter et al. |

(Continued)

Primary Examiner—Robert J Sandy
(74) Attorney, Agent, or Firm—Charles J. Rupnick, Attorney at Law

(57) ABSTRACT

A universal cradle apparatus having a telescoping clamping mechanism formed of a drive frame and a cooperating drive shaft that is movable along a common operating axis with first and second mounting surfaces each positioned on a respective one of the drive frame and the drive shaft, and first and second jaw structures each being coupled to a respective one of the drive frame and the drive shaft adjacent to the respective mounting surface thereof, each of the jaw structures having a respective clamping surface thereon and forming mutually opposing interior clamping surfaces arranged adjacent to the mounting surfaces positioned therebetween, and the clamping surface on the second jaw structure being spaced above and inclined toward the respective mounting surface and resiliently flexible relative thereto.

20 Claims, 9 Drawing Sheets

U.S. PATENT DOCUMENTS

| | | |
|---|---|---|
| 5,788,202 A | 8/1998 | Richter |
| 5,793,614 A | 8/1998 | Tollbom |
| 5,845,885 A | 12/1998 | Carnevali |
| 5,903,645 A | 5/1999 | Tsay |
| 5,917,907 A | 6/1999 | Kela |
| 6,032,337 A | 3/2000 | Rankin et al. |
| 6,076,790 A | 6/2000 | Richter |
| 6,095,470 A | 8/2000 | Kalis |
| 6,173,933 B1 | 1/2001 | Whiteside et al. |
| 6,213,438 B1 | 4/2001 | Ostby et al. |
| 6,229,893 B1 | 5/2001 | Chen |
| 6,370,741 B1 * | 4/2002 | Lu ................ 24/523 |
| 6,427,959 B1 | 8/2002 | Kalis et al. |
| 6,600,827 B2 | 7/2003 | Lu |
| 6,647,248 B1 | 11/2003 | Ortscheid et al. |
| 6,785,567 B2 | 8/2004 | Kato |
| 6,802,848 B2 | 10/2004 | Anderson et al. |
| 6,814,377 B2 | 11/2004 | Silverman et al. |
| 6,817,587 B2 | 11/2004 | Lin |
| 6,966,533 B1 * | 11/2005 | Kalis et al. ........ 248/316.4 |
| 7,017,243 B2 | 3/2006 | Carnevali |
| 7,032,872 B2 | 4/2006 | Sullivan |
| 2004/0022388 A1 | 2/2004 | Chan et al. |

\* cited by examiner

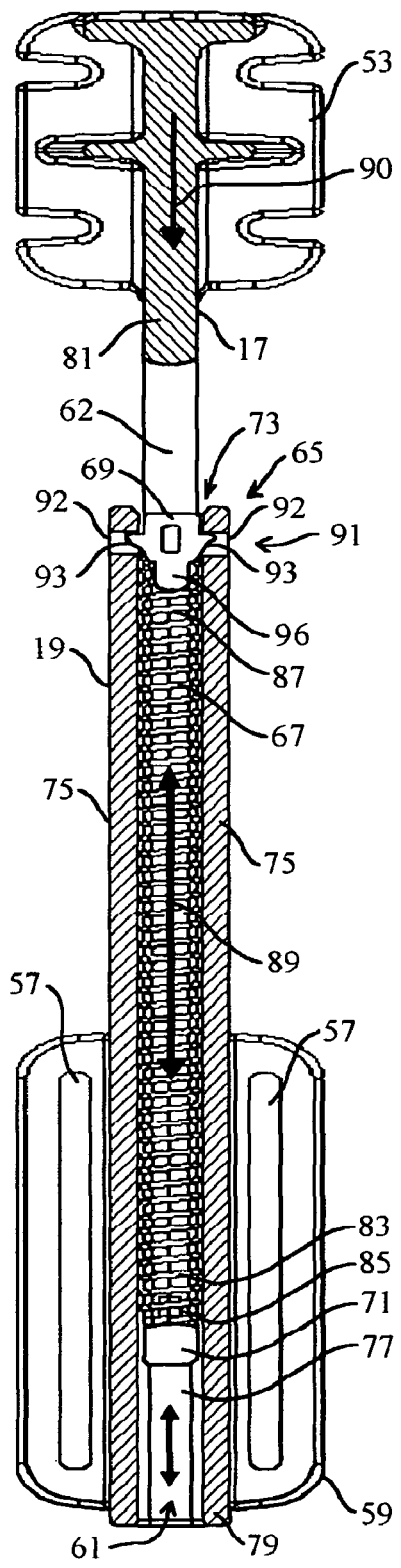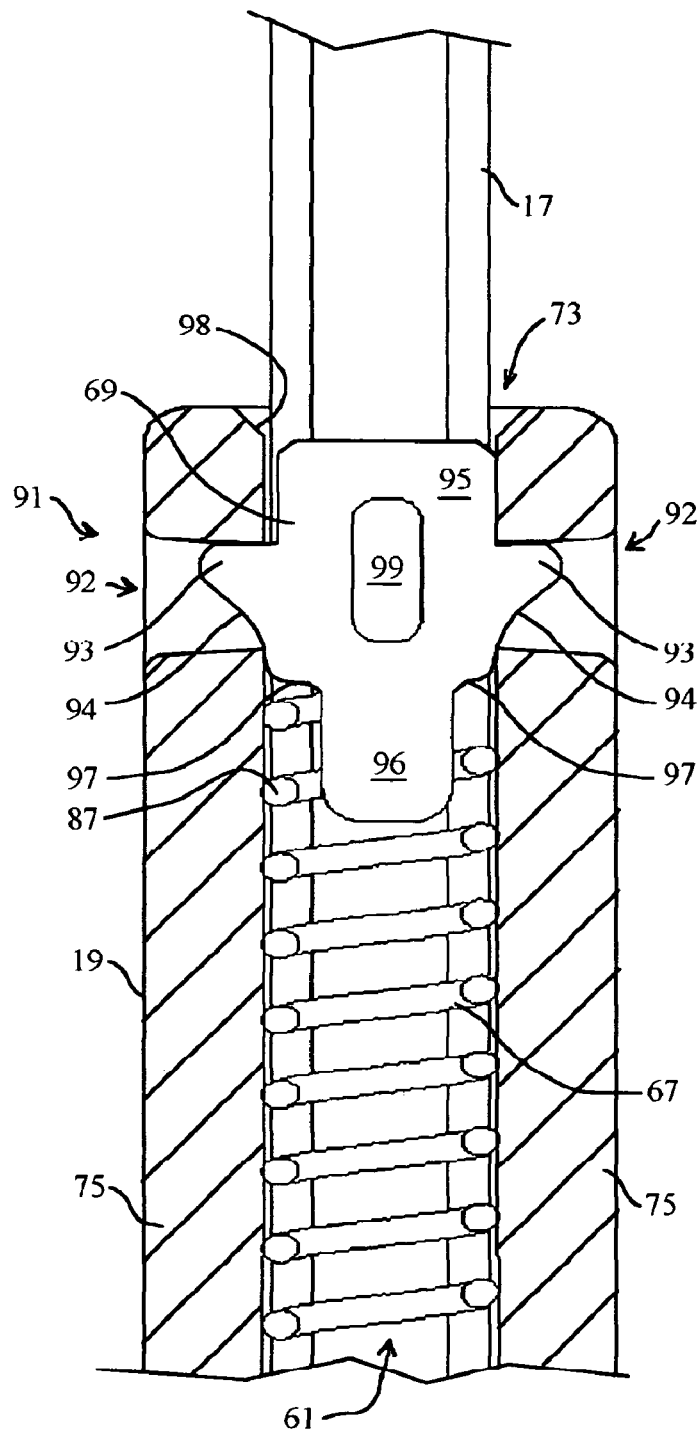
FIG. 3
FIG. 4

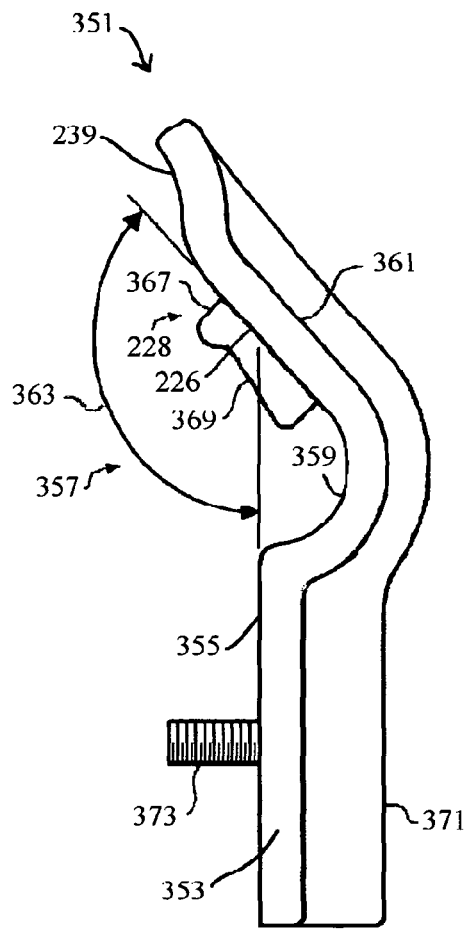
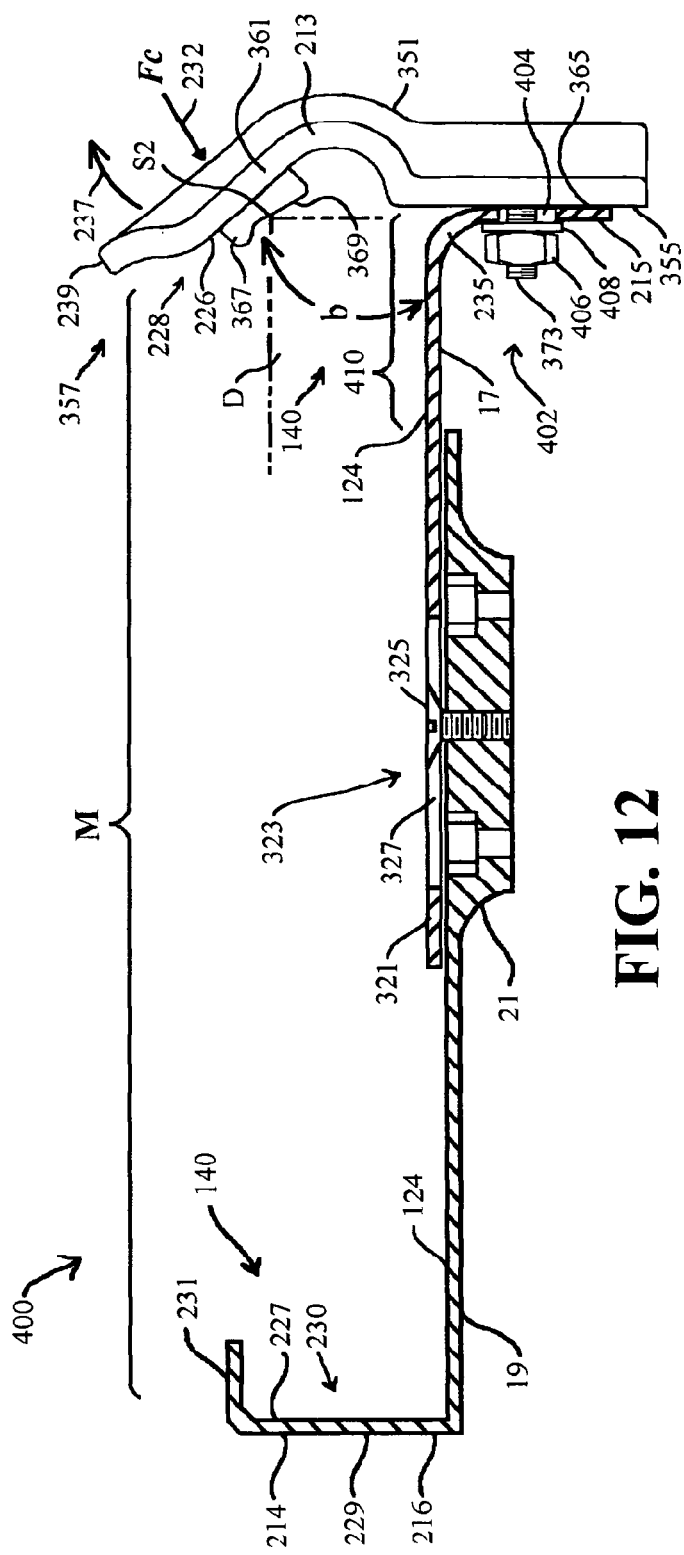
FIG. 11
FIG. 12

US 7,647,676 B2

THUMB RELEASE MOUNTING APPARATUS

RELATED APPLICATION

The present application is Continuation-In-Part and claims benefit of co-pending U.S. patent application Ser. No. 11/243,846 filed in the name of the inventor of the present application on Oct. 5, 2005, the complete disclosure of which is incorporated herein by reference, which is Continuation-In-Part and claims benefit of U.S. patent application Ser. No. 11/191,549 filed in the name of the inventor of the present application on Jul. 28, 2005, now U.S. Pat. No. 7,271,522 the complete disclosure of which is incorporated herein by reference, and both co-pending U.S. patent application Ser. No. 10/636,058 filed in the name of the inventor of the present application on Aug. 7, 2003, and co-pending U.S. patent application Ser. No. 11/136,797 filed in the name of the inventor of the present application on May 24, 2005, the complete disclosures of which are both also incorporated herein by reference.

The present application is related to U.S. patent application Ser. No. 11/345,591 which was filed in the name of the inventor of the present application on the same day herewith and is incorporated herein by reference.

FIELD OF THE INVENTION

The present invention relates to a releasable cradle mounting apparatus, and in particular to spring-return mounting apparatuses for securely releasably cradling lap top personal computers and other small or hand-held devices, such as DVD players.

BACKGROUND OF THE INVENTION

Mounting platforms are generally well-known for securely cradling and even electrically interfacing hand-held pocket-sized personal computers, commonly referred to as "pocket PCs," bar code scanners, and other substantially mobile electronic devices, such as cellular telephones, mobile global positioning system (GPS) receivers, Personal Digital Accessories (PDAs), handle-held personal computers and the like.

One such mounting platform is presented in U.S. Pat. No. 6,427,959, entitled MOUNTING BRACKET FOR AN ELECTRONIC DEVICE, issued Aug. 6, 2002, to Kalis, et al., which is incorporated herein by reference, which includes a cradle adapted for being releasably secured to the electronic device and also includes a support adapted for being mounted to a surface. The cradle is adapted to move along its longitudinal axis relative to an electrical connector that is slidably connected to the cradle. A user can fix the position of the cradle relative to the mounting surface by means of a pin and locking mechanism on the back of the cradle to the support.

Other mounting platforms are also currently known. However, current mounting platforms may be inefficient for effectively securely releasably cradling larger and irregularly shaped devices. Additionally, current mounting platforms are generally application specific and fail to provide truly universal cradling.

SUMMARY OF THE INVENTION

The present invention is a universal cradle apparatus that overcomes known limitations of prior art apparatus for securing an array of different hand-held or personal devices by providing a spring-return clamping mechanism that permits such hand-held or personal devices to be easily and securely cradled, while permitting quick drawing and easy removal of the device.

According to one aspect of the invention, the universal cradle apparatus of the present invention for securely cradling a hand-held or personal device in releasable manner is embodied by example and without limitation as a pair of opposing jaw structures each projected above a substantially planar mounting surface adapted to secured to cooperating male and female portions of a telescoping male linear drive shaft and mating female linear drive frame with at least one of the jaw structures being inclined toward the mounting surface and being resiliently flexible relative thereto.

According to another aspect of the invention, one or both of the jaw structures are further adjustable on the respective drive shaft and drive frame along a common operating axis of the clamping mechanism.

According to another aspect of the invention, either the male drive shaft or the female drive frame is relatively stationary relative to the cooperating member of the clamping mechanism, the relatively stationary member being formed with a substantially rigid base plate structured for being secured to an external mounting surface, such as a mounting plate of an external support structure, such as the ball-and-socket support structure disclosed by the inventor of the present invention in U.S. Pat. No. 5,845,885.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a section view through an expandably contractible spring-return clamping mechanism of the releasably-clamped universal cradle apparatus of the invention;

FIG. 4 is a close-up that illustrates one locking mechanism of the spring-return clamping mechanism of the invention;

FIG. 11 is a side view that illustrates one embodiment of a clamp member of the present invention;

FIG. 12 is a side cross-sectional view that illustrates another alternative releasably-clamped universal cradle apparatus of the present invention that incorporates the clamp member of the present invention, including but not limited to the clamp member illustrated in FIG. 1;

DETAILED DESCRIPTION OF PREFERRED EMBODIMENT

In the Figures, like numerals indicate like elements.

The universal cradle apparatus of the present invention is embodied by example and without limitation as a pair of substantially rigid jaw structures each configured with a flange structure having a substantially planar mounting surface adapted for being secured to respective cooperating male and female portions of a spring-return clamping mechanism formed of telescoping male linear drive shaft and mating female linear drive channel. The two jaw structures are each configured with a shallow cup-shaped clamping surface that is projected above the respective flange structure. The jaw structures are mounted on the respective drive shaft and drive channel each having its respective cup-shaped interior clamping surface facing toward the clamping surface of the other jaw. A spring is coupled for biasing the male drive shaft into the mating female drive channel of the clamping mechanism, thereby driving the two jaw structures together along a linear drive axis of the clamping mechanism.

The spring-return clamping mechanism includes the telescoping male linear drive shaft and mating female linear drive channel each having one of the jaw structures coupled adjacent to one end thereof. By example and without limitation, the drive shaft is structured with a T-shape that is sized to be movable within a mating hollow T-shaped drive channel that is structured along the drive axis. By example and without limitation, a compression spring is constrained within the drive channel between a foot portion of the drive shaft distal from its jaw and a locking key that is coupled within the drive channel adjacent to an opening thereinto that is distal from its jaw.

Figure 1:
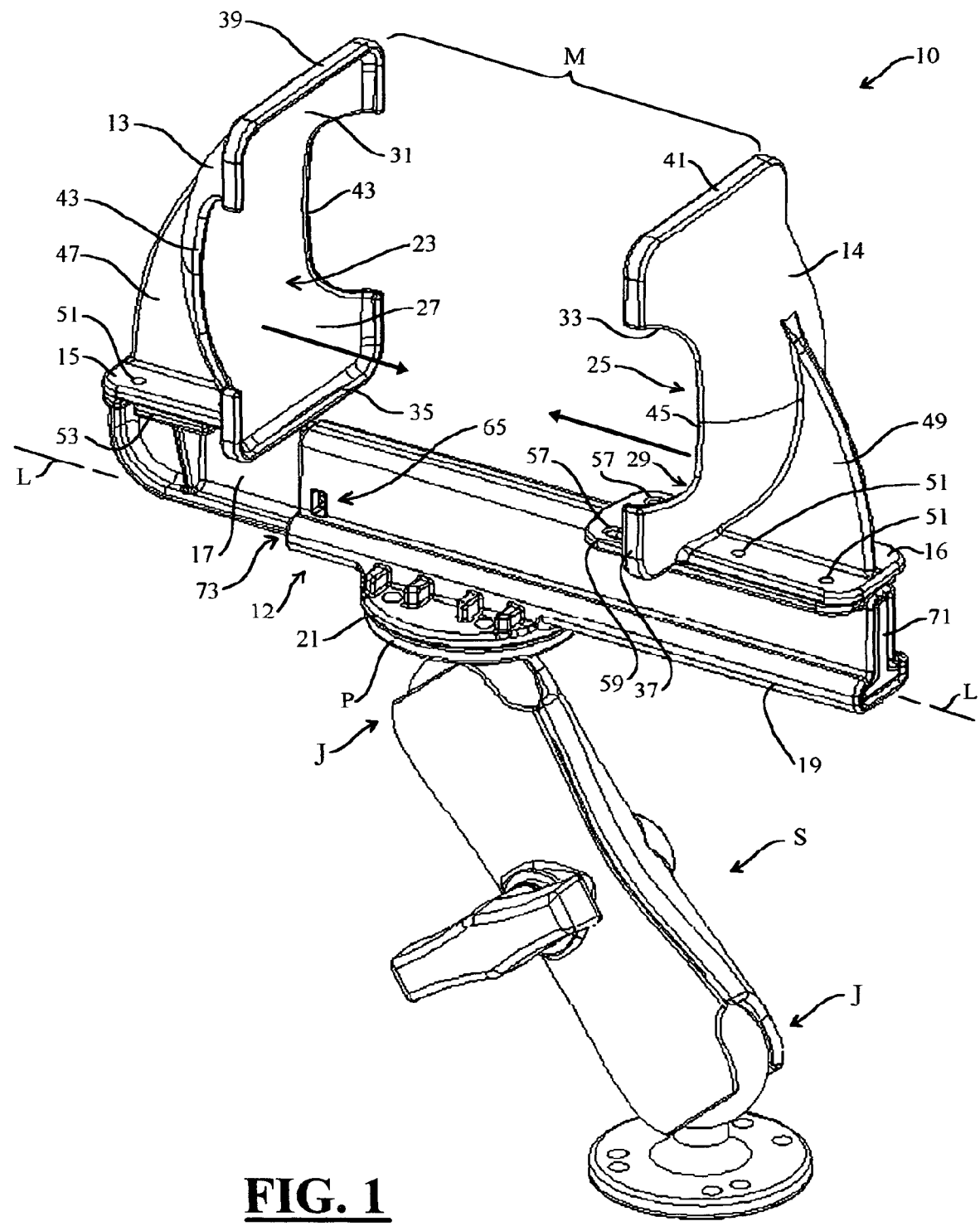
FIG. 1 is a perspective view that illustrates the present invention embodied as a releasably-clamped universal mounting apparatus for securely receiving a large or irregularly shaped device.

FIG. 1 is a perspective view that illustrates the apparatus of the present invention embodied as a releasably-clamped universal cradle apparatus 10 that is structured for securely receiving different larger or irregularly shaped devices. The apparatus 10 is structured with a spring-return clamping mechanism, shown generally at 12, arranged relative to a pair of opposing jaw structures 13, 14 that are structured to cooperate for securely releasably cradling different larger or irregularly shaped devices. The jaw structures 13, 14 are each formed of a respective base flange 15, 16 that is structured for coupling to one of an elongated male drive shaft 17 and a mating elongated female drive frame 19 of the spring-return clamping mechanism 12. The spring-return clamping mechanism 12 is integrated with the jaw structures 13, 14 in an expandably contractible assembly structured for elastically urging the movable drive shaft-mounted jaw 13 against the relatively stationary drive frame-mounted jaw 14, as indicated by the arrows.

Each of the jaw structures 13, 14 and the male drive shaft 17 and mating female drive frame 19 of the spring-return clamping mechanism 12 are optionally individually integrally formed of a substantially rigid and resilient material, such as a rigid metal, plastic or composite material for making the cradle apparatus 10 of the invention substantially rigid and resilient.

Either the male drive shaft 17 or the female drive frame 19 (shown) is further structured to be substantially stationary relative to the other mating member of the spring-return clamping mechanism 12. By example and without limitation, the relatively stationary member (shown as female drive frame 19) is formed with a substantially rigid base plate 21 that is structured for being secured to an external mounting surface, such as a mounting plate P of an external support structure S, such as the ball-and-socket support structure disclosed by the inventor of the present invention in U.S. Pat. No. 5,845,885, UNIVERSALLY POSITIONABLE MOUNTING DEVICE, issued to the inventor of the present invention on Dec. 8, 1998, which is incorporated in its entirety herein by reference.

As is generally well-known, pocket PCs, bar code scanners, and other mobile electronic devices of the type which are intended to be supported by the apparatus 10 of the invention typically include operational controls and an information viewing or display screen located either on different faces or on a single face. Some devices, such as some bar code scanners, also include handles for gripping by the user. Aspects of the apparatus 10 of the invention are therefore structured to expose as much as possible of the faces and gripping handles of the device to the user, including the facial operational controls and display screen. For example, according to the embodiment illustrated herein, the jaw structures 13, 14 are each configured with a respective shallow generally cup-shaped interior clamping surface 23, 25 that is projected above the base plate 21 and clamping mechanism 12. The interior clamping surfaces 23, 25 of the respective jaw structures 13, 14 are generally structured for positively engaging opposite ends of such a device that is inserted therebetween. The jaw structures 13, 14 are mounted on the respective male drive shaft 17 and mating female drive frame 19, each having its respective cup-shaped interior clamping surface 23, 25 facing toward the interior clamping surface of the opposing jaw structure.

The spring-return clamping mechanism 12 drives the jaw structures 13, 14 expandably together substantially along a common longitudinal drive axis L of the mating male drive shaft 17 and female drive frame 19 for forming a mouth opening M of variable length between the opposing clamping surfaces 23, 25. The length of the mouth opening M between the opposing clamping surfaces 23, 25 is expanded by forcing apart the movable male drive shaft 17 and relatively stationary female drive frame 19 along the common longitudinal drive axis L as the spring-return clamping mechanism 12 simultaneously urges the jaw structures 13, 14 back together for capturing and securing an inserted device therebetween. By example and without limitation, the male drive shaft 17 is formed as a bar having a cross-legged shape, and the female drive frame 19 is formed having a mating hollow cross-legged shape, such as the T-shape illustrated here. Alternative cross-legged shapes include any convenient shape having at least two crossed legs, including: an F-shape, an I-shape, an L-shape, a U-shape, a V-shape, and an X-shape. The mating cross-legged shapes of the drive shaft 17 and drive frame 19 are not necessary or critical to the invention. However, the mating cross-legged shapes help to resist twisting about the longitudinal drive axis L during operation. The mating cross-legged shapes also help to stiffen the drive shaft 17 and drive frame 19 that form the spine of the cradle apparatus 10 of the invention.

The shallow generally cup-shape of the clamping surface 23, 25 optionally enclose a generally globular shape, but may also enclose a slightly flattened globular shape. The generally globular or slightly flattened shapes of the clamping surface 23, 25 tent to center the inserted device therein as the spring-return clamping mechanism 12 simultaneously urges the jaw structures 13, 14 together. The clamping surfaces 23, 25 alternatively enclose a generally upright egg shape having a slightly deeper flattened cup shape in their respective proximate portions 27, 29 nearer the clamping mechanism 12, and a slightly shallower flattened cup shape at the respective outer or distal portions 31, 33 of the jaw structures 13, 14. The flattened upright egg shape of the clamping surface 23, 25 presses on the inserted device and urges it toward the drive frame 19 as the spring-return clamping mechanism 12 simultaneously urges the jaw structures 13, 14 together.

Each of the respective proximate and distal jaw structure portions 27, 29, 31, 33 optionally includes a respective peripheral lip 35, 37, 39, 41 that stiffen the clamping surface 23, 25, thereby making the apparatus 10 of the invention more effective for holding heavier objects.

Optionally, the jaw structures 13, 14 are optionally formed as respective shallow recesses 43, 45 on opposites sides thereof between their respective proximate and distal portions 27, 29, 31, 33. The recesses 43, 45 may include their own stiffening lips such that the respective peripheral lips 35, 37, 39, 41 form substantially continuous peripheral stiffening lips around the clamping surface 23, 25. Alternatively, the recesses 43, 45 interrupt the respective peripheral lips 35, 37, 39, 41, as illustrated. Optionally, gussets 47, 49 stiffen the respective jaw structures 13, 14 along the common longitudinal drive axis L of the mating male drive shaft 17 and female drive frame 19.

The jaw structures 13, 14 and their respective cup-shaped clamping surface 23, 25 are each optionally substantially symmetric relative to the common longitudinal drive axis L of the clamping mechanism 12. Optionally, the structures 13, 14 are substantially identical, including their respective base flanges 15, 16 and cup-shaped clamping surfaces 23, 25.

One or both of the jaw structures 13, 14 is optionally permanently movable along the respective male drive shaft 17 and female drive frame 19 for permanently adjusting the expansive range of the mouth opening M therebetween. For example, one jaw structure 13 is coupled to the male drive shaft 17 in a fixed position by one or more fasteners 51 coupled between the jaw structure's base flange structure 15 and a mating flange structure 53 on the male drive shaft 17. As illustrated, the fasteners 51 are positioned substantially symmetrically on opposite sides of the jaw structure 13. The other jaw structure 14 is permanently movable along the female drive frame 19 by one or more of the fasteners 51 coupled between the jaw structure's base flange 16 and one or more mating longitudinal slots 57 through a mating flange structure 59 on the female drive frame 19. As illustrated, the longitudinal slots 57 and cooperating fasteners 51 are positioned substantially symmetrically on opposite sides of the jaw structure 14.

Figure 2:
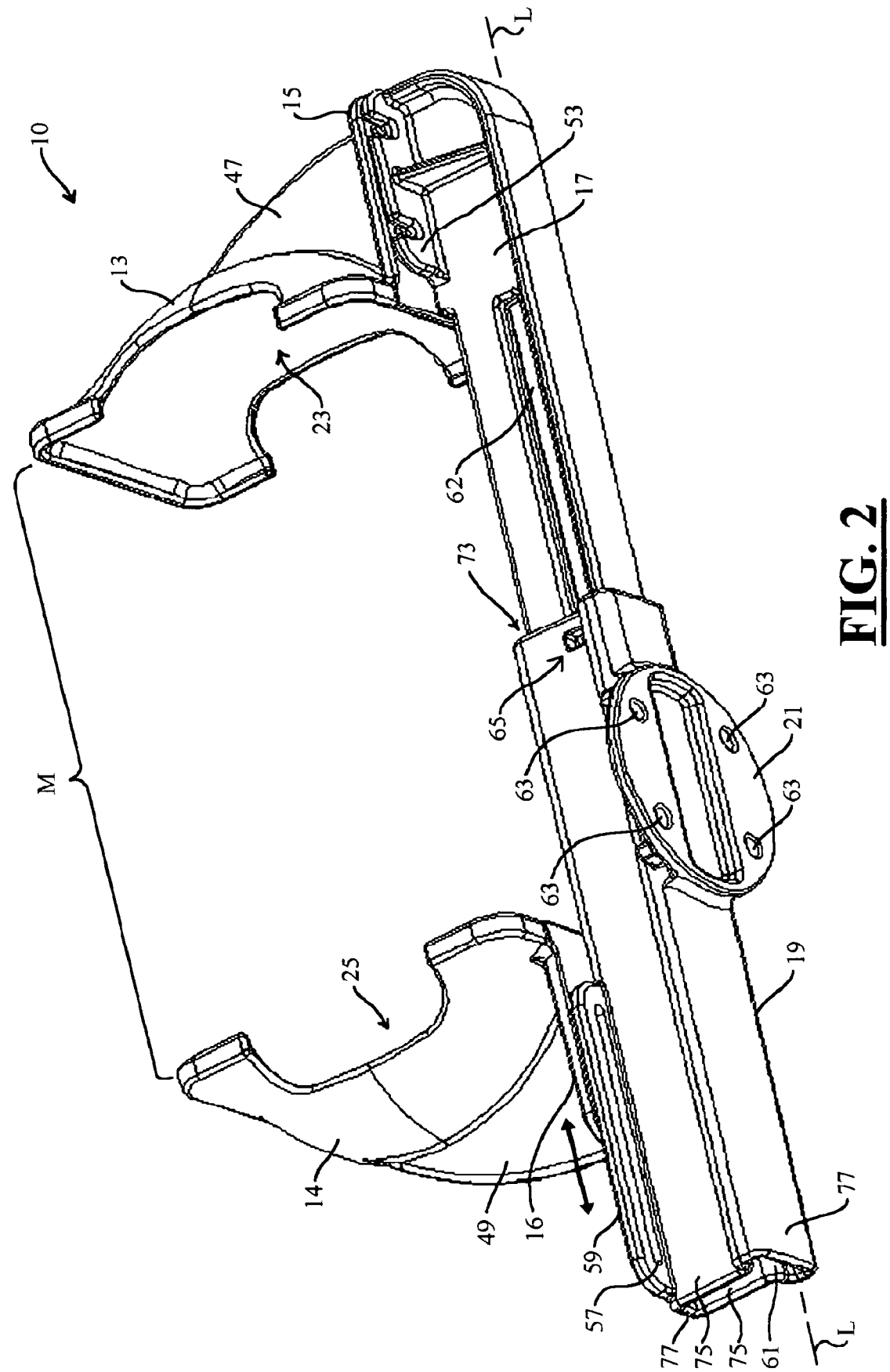
FIG. 2 is a perspective view that illustrates the releasably-clamped universal mounting apparatus of the present invention.

FIG. 2 is a different perspective view that illustrates the releasably-clamped universal cradle apparatus 10 of the present invention. Here, the longitudinal slots 57 are shown as continuous longitudinal slots through the flange 59 on the female drive frame 19 for mating with the slots or holes 55 through the base flange 16 of the jaw structure 14. As illustrated, the mating holes 55 and longitudinal slots 57 permit the base flange 16 of the jaw structure 14 to be moved to different positions along the mating flange 59 on the female drive frame 19, as illustrated by the arrow, by merely loosening and subsequently tightening the fasteners 51 therebetween. The mouth opening M between the jaw structures 13, 14 is thereby temporarily or permanently adjustable along the longitudinal drive axis L for operating in within a different larger or smaller expansive range.

The flange 53 is illustrated as being integrally formed on the bottom of the T-shaped male drive shaft 17 and imparting an I-shape on a portion of the male drive shaft 17 that remains outside the female drive frame 19. The flange 53 thus provides the dual functions of securing the stationary jaw structure 13 and acting as a fixed stop between the male drive shaft 17 and female drive frame 19.

Also shown are the mating and relatively movable T-shapes of the male drive shaft 17 and female drive frame 19. As illustrated here, the female drive frame 19 completely encloses a substantially continuous longitudinal T-shaped female opening or drive channel 61 that extends substantially the entire length of the elongated drive frame 19 and is sized to receive therein the substantially continuous longitudinal T-shape of the elongated male drive shaft 17.

According to one embodiment of the invention, the elongated male drive shaft 17 optionally includes an elongated lengthwise slot 62 formed therein. When present, the elongated lengthwise slot 62 optionally runs substantially the entire length of the elongated male drive shaft 17 from the mating flange structure 53 formed thereon to a foot portion 71 thereof (shown in a subsequent Figure). When present, the elongated lengthwise slot 62 is structured to operate as described herein below.

The relatively stationary female drive frame 19 is illustrated as being integrally formed with the substantially rigid base plate 21 that is structured for being secured to an external mounting surface, such as the mounting plate P of the external support structure S, as illustrated in a previous Figure. For example, the integral base plate 21 extends beyond the female drive frame 19 and is formed with one or more mounting slots or holes 63 structured for receiving suitable fasteners for coupling to the mounting plate P.

FIG. 3 is a section view through the expandably contractible spring-return clamping mechanism 12 of the releasably-clamped universal cradle apparatus 10 with the jaw structures 13, 14 removed for clarity. The spring-return clamping mechanism 12 includes a locking mechanism, shown generally at 65, of the invention for capturing an elastically compressible biasing member 67 between the movable male drive shaft 17 and the relatively stationary female drive frame 19. The locking mechanism 65 of the invention is embodied as a locking key 69 that is combined with both the movable male drive shaft 17 and the relatively stationary female drive frame 19.

By example and without limitation, the male drive shaft 17 is structured to move lengthwise within the drive channel 61 of the relatively stationary female drive frame 19 with the elastically compressible biasing member or compression spring 67 being constrained within the drive channel 61 between the locking key 69 and the foot portion 71 of the drive shaft 17 distal from the I-shaped portion thereof formed by the flange structure 53 holding the jaw structure 13. The locking key 69 is coupled within the drive channel 61 adjacent to an opening 73 thereinto adjacent to one end of the female drive frame 19 where into the drive shaft 17 is inserted.

By example and without limitation, the female drive channel 61 is formed with a closed surface having opposing channel walls 75 that are coupled in a spaced-apart manner by a pair of spaced-apart opposing channel spacer walls 77 (one shown) intervening therebetween. As illustrated in one or more other Figures, the intervening spacer walls 77 form the base and cap of the T-shaped female drive frame 19, whereby the female drive channel 61 has a substantially constant cross-sectional interior configuration for substantially its entire length. Although possibly more difficult to manufacture, the female drive channel 61 is optionally closed at its aft end 79 opposite the opening 73 thereinto. As discussed herein, the female drive frame 19 of the spring-return clamping mechanism 12 is optionally individually integrally formed of a substantially rigid and resilient material such that the closed-surface of female drive channel 61 operates as a stiffener to rigidify the female drive frame 19 against both twisting and bending. The spaced-apart channel walls 75 stiffen the female drive frame 19 substantially in the plane of the jaw structures 13, 14, and the spaced-apart base and cap walls 77 stiffen the female drive frame 19 substantially crosswise to the plane of the jaw structures 13, 14.

The elastically compressible biasing member 67, which is illustrated by example and without limitation as a conventional coil-type compression spring of steel or another suitable material, is inserted between the jaw end 81 of the elongated male drive shaft 17 adjacent to the flange structure 53 thereof and its distal foot portion 71. The distal foot portion 71 of the elongated drive shaft 17 is structured to engage and restrain one end 83 of the biasing spring 67. The distal foot portion 71 of the elongated drive shaft 17 optionally includes a tab or nib 85 structured to engage and restrain the end 83 of the biasing spring 67. Although useful for ease of assembly, the tab or nib 85 is not necessary or critical for practicing the invention. As discussed herein above, the elongated drive shaft 17 optionally includes the elongated lengthwise slot 62 formed therein, as best illustrated in FIG. 2. When present, the tab or nib 85 that is structured to engage and restrain the end 83 of the biasing spring 67 is formed in one end of the slot 62 adjacent to the distal foot portion 71 of the elongated drive shaft 17.

After this assembly with biasing spring 67, the elongated male drive shaft 17 is inserted into the closed-surface female drive channel 61. The second foot portion 71 of the elongated male drive shaft 17 is inserted through into the opening 73 and slid toward the opposite aft end 79 of the female drive channel 61. The elongated male drive shaft 17 is thereby slidingly engaged with the female drive channel 61 formed between the spaced-apart channel walls 75 and intervening base and cap walls 77 of the elongated female drive frame 19.

The biasing spring 67 of the clamping mechanism 12 is additionally compressed against the second distal foot portion 71 of the elongated male drive shaft 17 by pressure exerted against a free end 87 of the biasing spring 67. While in a generally relaxed or expanded condition, the free end 87 of the biasing spring 67 is positioned against the distal foot portion 71 of the elongated drive shaft 17 within the closed-surface female drive channel 61. The locking key 69 is installed between the free end 87 of the biasing spring 67 and the aft or jaw end 81 of the drive shaft 17. The biasing spring 67 is thereafter expandably compressed between the locking key 69 and distal foot portion 71 of the movable clamp's elongated drive shaft 17 while the locking key 69 is mechanically coupled to the female drive channel 61 adjacent to its opening 73. The biasing spring 67 thereafter exerts an expanding spring force F, illustrated by the arrow 89, between the locking key 69 and the distal foot portion 71 of the elongated drive shaft 17 that contracts or biases the flange structure 53 holding the jaw structure 13 along the female drive channel 61 toward the flange 59 of the female drive frame 19 holding the other jaw structure 14, as illustrated by the arrow 90. The biasing spring 67 thereby operates to expandably bias the movable jaw structure 13 mounted on the male drive shaft 17 toward the stationary jaw structure 14 mounted on the female drive frame 19 for securing an inserted device between the respective clamping surface 23, 25. The biasing spring 67 is selected having a spring rate sufficient to cause the movable jaw structure 13 to securely cradle the inserted device against the cooperating stationary jaw structure 14.

According to the embodiment of the invention as illustrated here and more clearly illustrated here, at least one, and optionally both (shown), of the opposing channel walls 75 are formed with a cooperating locking structure, shown generally at 91, within the channel walls 75 of the female drive channel 61 portion of the female drive frame 19. By example and without limitation, the cooperating locking structure 91 is formed as a single notch 92 or a pair of opposing notches in the channel walls 75 adjacent to the channel opening 73. The notch or notches 92 are structured to engage mating detents 93 on the locking key 69, whereby the locking key 69 is fixed in locked relationship with the female drive channel 61 portion of the female drive frame 19. Thereafter, the closed-surface female drive channel 61 and the locking key 69 together operate to constrain the biasing member or compression spring 67 such that it spring-loads or "biases" the movable male drive shaft 17 toward the cradle's relatively stationary female drive frame 19 in a retractable or expandable manner. For ease of manufacturing the notches 92 are apertures formed completely through the respective channel walls 75 (shown). The notches 92 are optionally closed indentations formed on opposing interior surfaces of the channel walls 75. The detents 93 engage the opposing notches 92 to fix the locking key 69 in locked relationship with the female drive frame 19 and to capture the compression spring 67 within the female drive channel 61 between the distal foot portion 71 of the movable elongated drive shaft 17 and the opening 73 of the female drive channel 61 distal from the cradle's stationary jaw structure 14.

The locking key 69 is formed of a substantially incompressible material, for example metal or hard plastic, so that the detents 93 are stiff and unyielding. As discussed herein, the closed-surface of female drive channel 61 is formed of a substantially rigid material, such as a metal, rigid plastic or composite material. The channel walls 75 are constructed having a width and thickness calculated to cooperate with the locking key 69 such that one or both of the channel walls 75 flex slightly to admit the locking key 69 therebetween when sufficient pressure is applied to force locking key 69 through the opening 73 into the female drive channel 61.

FIG. 4 is a close-up that illustrates the locking mechanism 65 of the spring-return clamping mechanism 12, wherein the detents 93 of the locking key 69 are each formed with a lead-in 94 for easing entry of the locking key 69 through the opening 73 into the female drive channel 61. The lead-ins 94 are, for example, a bevel or chamfer or a fillet (shown). The opening 73 into the female drive channel 61 may include a lead-in 146 (98) that further eases entry of the locking key 69.

The locking key 69 includes a body 95 that is shaped to cooperate with the interior of the female drive channel 61 and is sized to fit through the opening 73 thereinto and thereafter to become fixed in locked relationship with the notches 92, whereby the opening 73 is blocked. For example, the key body 95 is substantially rectangular in cross-section when the female drive channel 61 is formed with substantially planar walls 75. Optionally, the locking key 69 includes an integral tab or "nose" portion 96 that is structured to engage and capture the free end 87 of the biasing spring 67. In order to engage the biasing spring 67, the nose 96 is formed smaller than the key body 95 so that a shoulder 97 is formed at the intersection. The shoulder 97 provides a rest or stop for supporting the biasing spring 67 in a partly compressed state when the biasing spring 67 is a conventional compression spring wound in a tubular shape along its active longitudinal axis, as illustrated. Thus, the nose 96 is sized to fit inside the tubular spring 67, while the shoulder 97 is sized larger than the outer diameter of the tubular biasing spring 67. The nose 96 thereby provides purchase on the locking key body 95 during assembly that helps to maintain the relative positioning and alignment of the biasing spring 67 with the locking key body 95. Optionally, the nose 96 includes means for securing the biasing spring 67 relative to the locking key 69. For example, the nose 96 is formed with a cross-axis dimension, such as a diameter, sized to be a slight interference fit within the tubular coil-type biasing spring 67.

During assembly the key's nose 96 is fitted into the previously free end 87 of the tubular biasing spring 67. The locking key 69 is then pressed through the channel opening 73 and between the spaced-apart channel walls 75. The key's lead-ins 94 and channel opening's lead-in 146 are used to ease entry of the locking key 69. The channel walls 75 resiliently flex and spread apart to admit the key's detents 93 that extend from the key's body 95. The channel walls 75 continue to flex and spread apart as the key 69 travels along the female drive channel 61. The key's body 95 and nose 96 are further structured to cooperate with the channel walls 75 and the biasing spring 67, respectively, to maintain alignment of the key 69 with the female drive channel 61. When the key 69 is pushed far enough into the female drive channel 61, the key's detents 93 encounter and enter the notches 92 in the channel walls 75. Upon entry of the detents 93 into the cooperating notches 92 the substantially rigid and resiliently flexible spaced-apart opposing channel walls 75 resiliently revert or "snap back" to their natural shape, whereby the key's detents 93 are nested and substantially permanently captured in the cooperating notches 92. The biasing spring 67 is thereby permanently captured within the female drive channel 61 between the distal foot portion 71 of the clamp's elongated drive shaft 17 and the opening 73 into the female drive channel 61 distal from the flange 59 of the female drive frame 19 holding the stationary jaw structure 14.

According to one embodiment of the invention, the key body 95 optionally includes means for easing ejection from a mold, when the key 69 is manufactured by injection molding plastic, or means for controlling the key 69 during assembly. For example, the key body 95 is hollowed by a aperture 99 therethrough either for a mold ejection pin, or an assembly guide pin or other control device.

Other configurations for both the locking key 69 and the cooperating locking structure 91 are also contemplated, as illustrated by reference to either of co-pending U.S. patent application Ser. No. 10/636,058 or co-pending U.S. patent application Ser. No. 11/136,797, both incorporated herein by reference. For example, as disclosed in these co-pending US patent applications, the channel walls 75 of the female drive frame 19 are substantially inflexible, and when sufficient pressure is applied, the locking key 69 flexes slightly to squeeze through the opening 73 into the female drive channel 61 between the substantially inflexible channel walls 75.

Alternative Embodiments

Mounting platforms are generally well-known for securely cradling and even electrically interfacing personal computers, commonly referred to as "lap tops," and other substantially mobile electronic devices, such as lap top digital video device (DVD) players and the like. However, current mounting platforms may be inefficient for effectively securely releasably cradling larger lap top personal computers and other small or hand-held devices, such as DVD players, having substantially regular generally rectangular shapes and substantially flat bottom mounting surfaces. Also, such existing mounting platforms may be bulky in configuration, or awkward for insertion and removal of the device.

Figure 5:
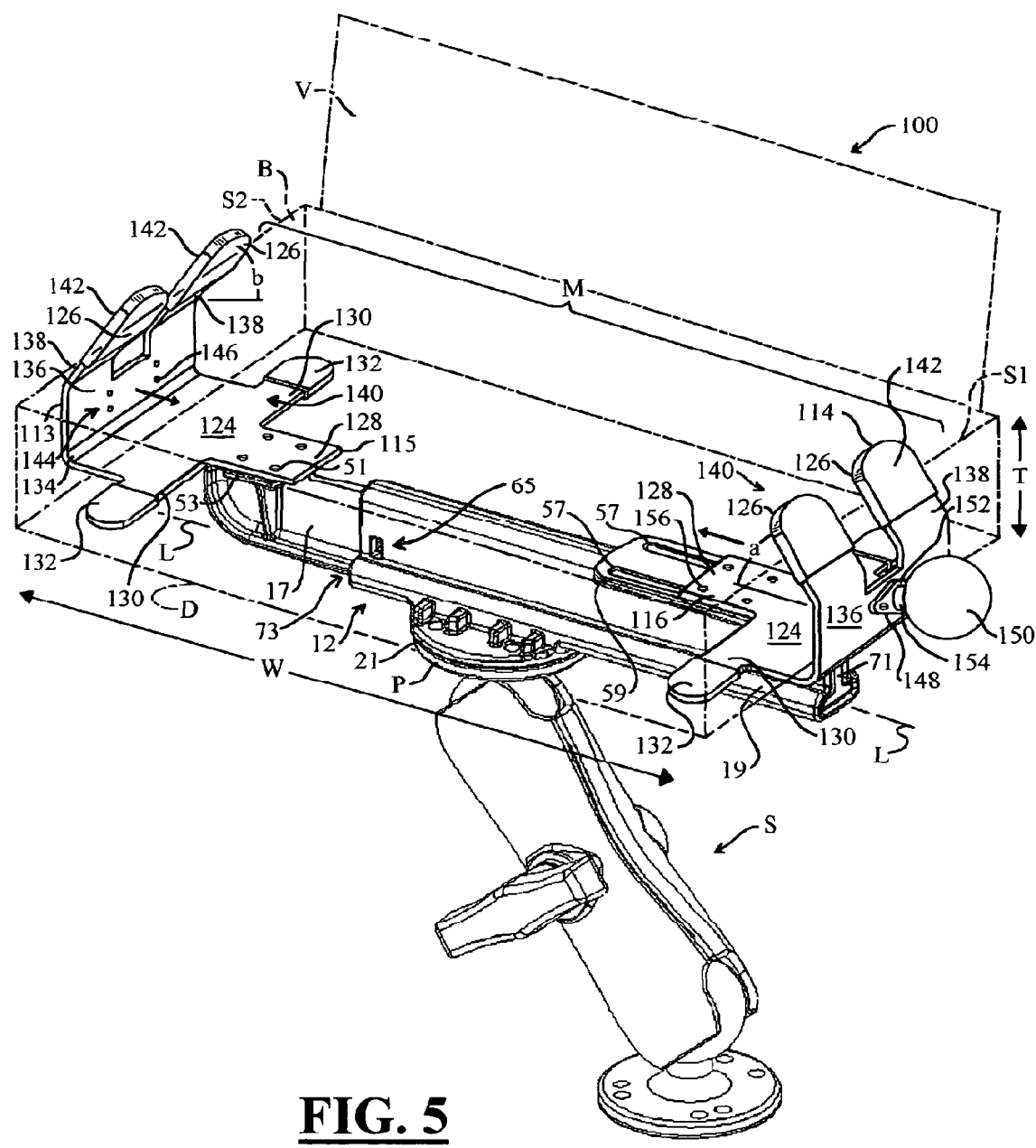
FIG. 5 is a perspective view that illustrates the present invention embodied as a releasably-clamped universal mounting apparatus for securely receiving a regularly shaped device having a substantially flat bottom.

FIG. 5 is a perspective view that illustrates the apparatus of the present invention embodied as an alternative releasably-clamped universal cradle apparatus 100 that is structured for securely receiving different portable personal computers, commonly referred to as "lap tops," and other small or hand-held devices, such as DVD players, having substantially flat mounting surfaces, usually referred to as a "bottom" surface of the device. The apparatus 100 is structured with the spring-return clamping mechanism, shown generally at 12, arranged relative to a pair of opposing jaw structures 113, 114 that are structured to cooperate for securely releasably cradling different larger or irregularly shaped devices. The jaw structures 113, 114 are each formed of a respective base flange 115, 116 that is structured for coupling to one of the elongated male drive shaft 17 and mating elongated female drive frame 19 of the spring-return clamping mechanism 12. The spring-return clamping mechanism 12 is integrated with the jaw structures 113, 114 in an expandably contractible assembly structured for elastically urging the movable drive shaft-mounted jaw 114 against the relatively stationary drive frame-mounted jaw 113, as indicated by the arrows.

Each of the jaw structures 113, 114 and the male drive shaft 17 and mating female drive frame 19 of the spring-return clamping mechanism 12 are optionally individually integrally formed of a substantially rigid and resilient material, such as a rigid metal, plastic or composite material for making the cradle apparatus 100 of the invention substantially rigid and resilient.

As discussed herein, either the male drive shaft 17 or the female drive frame 19 (shown) is further structured to be substantially stationary relative to the other mating member of the spring-return clamping mechanism 12. By example and without limitation, the relatively stationary member (shown as female drive frame 19) is formed with substantially rigid base plate 21 that is structured for being secured to an external mounting surface, such as mounting plate P of external support structure S, such as the ball-and-socket support structure disclosed by the same inventor in above incorporated U.S. Pat. No. 5,845,885, UNIVERSALLY POSITIONABLE MOUNTING DEVICE.

As is generally well-known, portable personal computers, commonly referred to as "lap tops," and other small or hand-held devices, such as DVD players, having substantially flat mounting surfaces, and other mobile electronic devices D (shown in phantom) of the type that are intended to be supported by the apparatus 100 of the invention typically include key boards and other operational controls in a base structure B and an information viewing or display screen V located either on a single face or on different faces (shown). Some devices also include handles for gripping by the user. Aspects of the apparatus 100 of the invention are therefore structured to expose as much as possible of the faces and gripping handles of the device to the user, including the base structure B having the facial operational controls and the display screen V. For example, according to the embodiment illustrated herein, the jaw structures 113, 114 are each configured with respective base flange 115, 116 each having a large substantially planar device mounting surface 124 with one or more interior clamping surfaces 126 that are projected there above and inclined toward the respective device mounting surfaces 124.

By example and without limitation, each base flange 115, 116 is formed having a central body 128 with a pair of outstretched arms 130 extended on opposite sides thereof forming the device mounting surface 124 whereupon the flat bottom of an inserted device D is rested. According to one embodiment of the present invention, at least a distal portion of each of the outstretched arms 130 is encased in a coating or cover 132 having a high coefficient of friction relative to the flange body 128 and arms 130 for increased gripping of an inserted device D. For example, the distal portion of each of the outstretched arms 130 has a plastic or rubber or another elastomeric material coupled thereto, either as the coating or cover 132. Alternatively, the coating or cover 132 is a gritty sandpaper or sandpaper-like substance having relatively high coefficient of friction. Additionally, the coating or cover 132 is slightly raised relative to the flange body 128 and arms 130 such that the substantially planar device mounting surfaces 124 is formed on top of the coating or cover 132 at the distal ends of the opposing flange arms 130.

Movable jaw structure 114 is coupled to the male drive shaft 17 in a fixed position by one or more fasteners 51 coupled between the jaw structure's base flange structure 115 and mating flange structure 53 on the male drive shaft 17. As illustrated, multiple fasteners 51 are positioned substantially symmetrically on opposite sides of the jaw structure 114. The other jaw structure 113 is permanently movable along the female drive frame 19 by one or multiple fasteners 51 coupled between the jaw structure's base flange 116 and mating longitudinal slots 57 through mating flange structure 59 on the female drive frame 19. As illustrated, the longitudinal slots 57 and cooperating fasteners 51 are positioned substantially symmetrically on opposite sides of the jaw structure 113. The fasteners 51 are flush or recessed relative to the respective flange body 128 so that they do interfere with the device mounting surfaces 124.

The interior clamping surfaces 126 are fixed in substantially stationary arrangements adjacent to respective distal ends 134 of the base flanges 115, 116 and are optionally formed integrally therewith, for example as by injection molding of the jaw structures 113, 114. By example and without limitation, the interior clamping surfaces 126 are extended from respective end walls 136 formed substantially perpendicular to the respective base flanges 115, 116 adjacent to respective distal ends 134. According to one embodiment of the present invention, the jaw structures 113, 114 each include two or more of the clamping surfaces 126 formed on distal ends of individual fingers 138 that are projected from respective flange end walls 136 and inclined toward the respective device mounting surfaces 124. The individual fingers 138 may be spaced apart across the common longitudinal drive axis L of the spring-return clamping mechanism 12.

The interior clamping surfaces 126 of the respective jaw structures 113, 114 are generally structured for positively engaging opposite ends of a generally rectangular and flat-bottomed device that is inserted therebetween. For example, jaw structures 113, 114 are mounted on the respective male drive shaft 17 and mating female drive frame 19, each having its respective interior clamping surface 126 facing generally toward the interior clamping surface of the opposing jaw structure and inclines toward the device mounting surface 124 of the respective jaw structure 113, 114.

The stationary and movable jaw structures 113, 114 are structured for accommodating devices D within a range of different thickness dimensions T. According to one embodiment of the invention, the apparatus 10 is illustrated here having the interior clamping surfaces 126 projected above the device mounting surfaces 124 of the base flanges 115, 116 for accommodating devices D of thicknesses T between a minimum and a maximum, where the minimum and maximum thicknesses T are typical for devices D of the type described herein currently available in the market. By example and without limitation, the stationary and movable jaw structures 113, 114 each have an interior opening 140 that encompass the entire range of device thicknesses T between the device mounting surface 124 of the base flanges 115, 116 and distal extents of the interior clamping surfaces 126.

According to one embodiment of the invention, the interior clamping surfaces 126 of the stationary and movable jaw structures 113, 114 form respective angles a, b with the device mounting surface 126. The angles a, b of the respective clamping surfaces 126 are any angle between 0 and 90 degrees, inclusive. However, according to one embodiment of the invention, the angles a, b of the respective clamping surfaces 126 are any angle in the range between about 45 degrees and about 75 degrees, inclusive. According to another embodiment of the invention, the angles a, b of the respective clamping surfaces 126 are about 75 degrees, but according to other embodiments of the invention can optionally vary + or −15 degrees or more, from about 60 to 90 degrees.

According to one embodiment of the invention, the angles a of the clamping surfaces 126 on the stationary jaw structure 113 are about the same as the angles b of the clamping surfaces 126 on the movable jaw structure 114. The angularly inclined clamping surfaces 126 facing inwardly and downwardly toward the device mounting surfaces 124 permit the jaw structures 113, 114 to engage the opposing superior shoulder portions S1, S2 on upper edges of the inserted device D anywhere along the entire length of the inclined clamping surfaces 126 so that devices D having different thicknesses T are easily accommodated, without adjustments in the positions of the clamping surfaces 126 relative to the device mounting surfaces 124.

As indicated by the arrows, the spring-loaded clamping mechanism 12 urges the elastically biased movable jaw structure 114 to approach the relatively stationary jaw structure 113 along the longitudinal drive axis L of the spring-return clamping mechanism 12. Urging the elastically biased movable jaw structure 114 simultaneously urges the opposing clamping surfaces 126 to approach one another along the longitudinal drive axis L such that the angularly inclined clamping surfaces 126 press on the opposing shoulder portions S1, S2 of the of the inserted device D to compress the inserted device D downwardly toward the device mounting surface 124. The inserted device D is thereby captured between the opposing inclined clamping surfaces 126 and the device mounting surfaces 124 of the base flanges 115, 116.

According to one embodiment of the invention, the two jaw structures 113, 114 are optionally formed of a generally stiff but slightly flexible material such as sheet metal or plastic. Accordingly, the two jaw structures 113, 114 operate as springs to compress the inclined clamping surfaces 126 inwardly toward the opposite jaw structure and downwardly toward the respective device mounting surface 124. Additionally, the slightly flexible material operates to accommodate a slight variation in width W of the device D inserted therebetween.

The spring-return clamping mechanism 12 drives the jaw structures 113, 114 expandably together substantially along the common longitudinal drive axis L of the mating male drive shaft 17 and female drive frame 19 for forming mouth opening M of variable length between the opposing clamping surfaces 126. The width of the mouth opening M between the opposing clamping surfaces 126 is expanded by forcing apart the movable male drive shaft 17 and relatively stationary female drive frame 19 along the common longitudinal drive axis L as the spring-return clamping mechanism 12 simultaneously urges the jaw structures 113, 114 back together for capturing and securing a device D inserted therebetween.

The jaw structures 113, 114 and their respective clamping surfaces 126 are each optionally substantially symmetric relative to the common longitudinal drive axis L of the clamping mechanism 12. Optionally, the structures 113, 114 are substantially identical, including their respective base flanges 115, 116 and inclined clamping surfaces 126.

According to one embodiment of the invention, at least a distal portion of each of the individual inclined fingers 138 is encased in a plastic or rubber coating or cover 142 that forms the respective clamping surfaces 126. For example, the coating or cover 142 has a high coefficient of friction relative to the fingers 138 for increased gripping of an inserted device D. Alternatively, the coating or cover 142 is a gritty sandpaper or sandpaper-like substance having relatively high coefficient of friction. Additionally, the coating or cover 142 is slightly raised relative to the fingers 138 such that the respective clamping surfaces 126 are formed on top of the coating or cover 142 at the distal ends of the fingers 138.

Additionally, one or both of the jaw structures 113, 114 includes means for attaching additional mounting structures thereto external of the interior jaw opening 140. By example and without limitation, the attaching means is provided by a pattern 144 of mounting holes 146 through the end walls 136 of respective base flanges 115, 116. The mounting holes 146 may be countersunk or counter bored holes that permit fasteners therethrough to be recessed into the respective end walls 136 to avoid interference with an inserted device D.

An additional mounting structure 148 is optionally attached to one or both of the jaw structures 113, 114, as shown for stationary jaw structure 113. By example and without limitation, the additional mounting structure 148 is optionally formed having a small sphere 150 of resiliently compressible material of the type described, for example, in above incorporated U.S. Pat. No. 5,845,885, UNIVERSALLY POSITIONABLE MOUNTING DEVICE. The sphere 150 may be projected from a mounting plate 152 on a post 154 for access by a pair of clamping arms of the type described, for example, in above incorporated U.S. Pat. No. 5,845,885, that together form a socket that is positionally secured relative to the sphere 150 when a clamping mechanism of the type described, for example, in above incorporated U.S. Pat. No. 5,845,885, is tightened.

Figure 6:
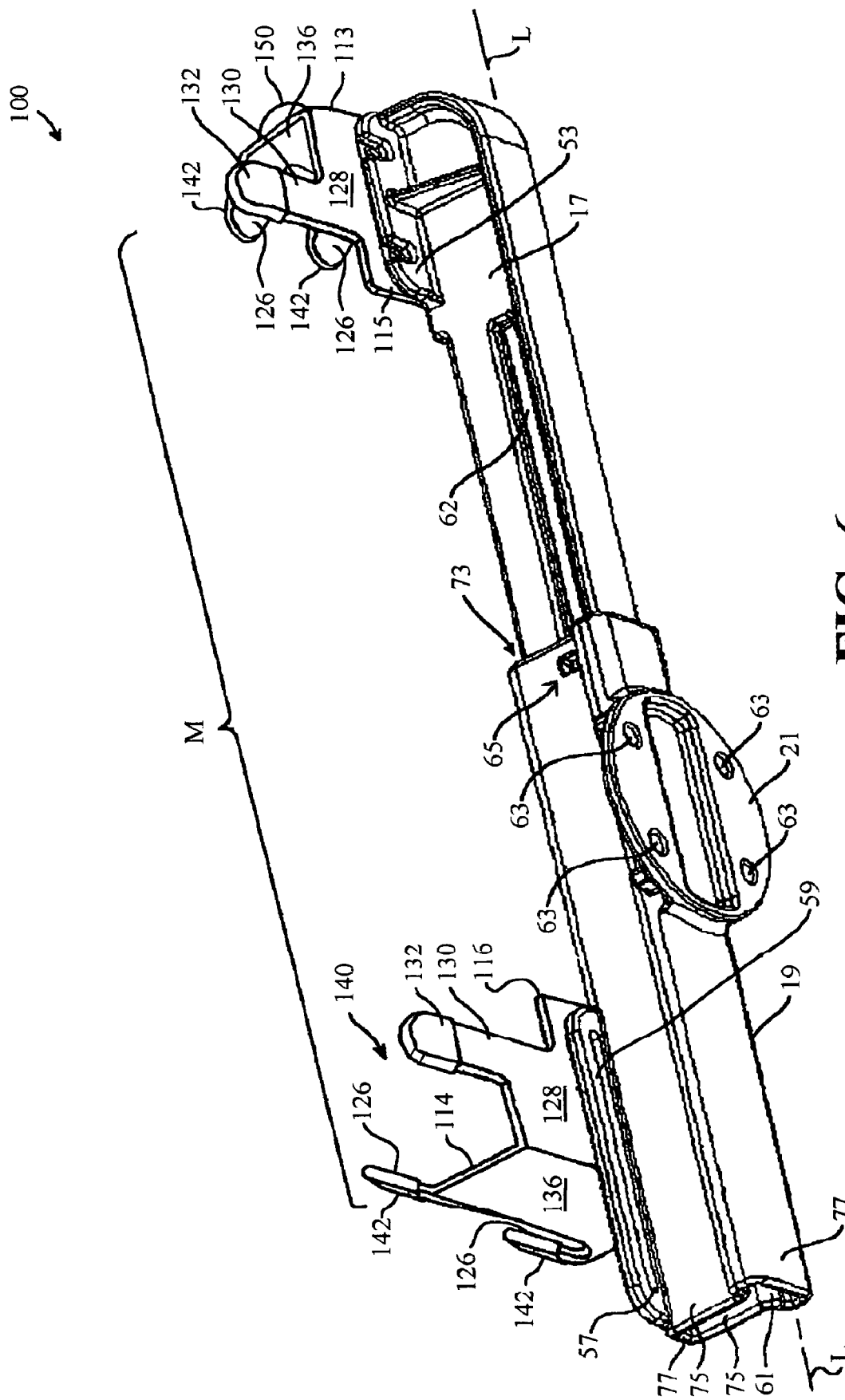
FIG. 6 is a different perspective view that illustrates the releasably-clamped universal mounting apparatus of the present invention illustrated in FIG. 5.

FIG. 6 is a different perspective view that illustrates the alternative releasably-clamped universal cradle apparatus 100 of the present invention. Here, the longitudinal slots 57 are shown as continuous longitudinal slots through the flange 59 on the female drive frame 19 for mating with the slots or holes 156 through the body 128 of base flange 115 of the stationary jaw structure 113. As illustrated, the mating holes 156 and longitudinal slots 57 permit the base flange 115 of the jaw structure 113 to be moved to different positions along the mating flange 59 on the female drive frame 19, as illustrated by the arrow, by merely loosening and subsequently tightening the fasteners 51 therebetween. The mouth opening M between the jaw structures 113, 114 is thereby temporarily or permanently adjustable along the longitudinal drive axis L for operating within a different larger or smaller expansive range.

The movable jaw structure 114 is mated to the flange 53 on the male drive shaft 17 by multiple fasteners 51 through the body 128 of base flange 116.

Figure 7:
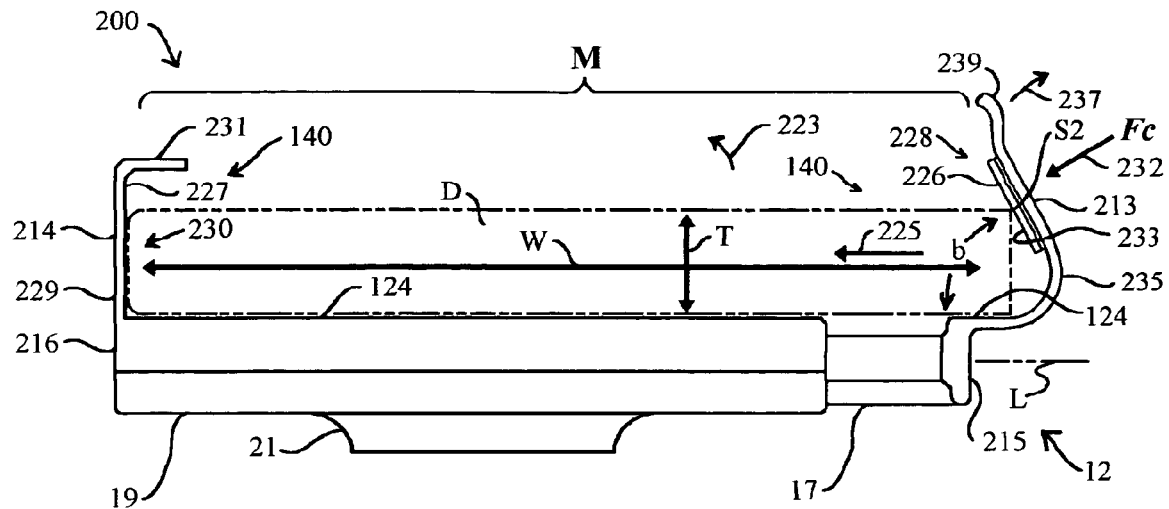
FIG. 7 is a side view that illustrates an alternative releasably-clamped universal cradle apparatus of the present invention.

FIG. 7 is a side view that illustrates the apparatus of the present invention embodied as an alternative releasably-clamped universal cradle apparatus 200 that is structured for securely receiving different portable personal computers, commonly referred to as "lap tops," and other small or hand-held devices, such as DVD players, having substantially flat mounting surfaces, usually referred to as a "bottom" surface of the device D. The apparatus 200 is structured with the spring-return clamping mechanism, shown generally at 12, arranged relative to a pair of opposing jaw structures 213, 214 that are structured to cooperate for securely releasably cradling different larger devices. The jaw structures 213, 214 are each formed of a respective base flange that is structured for coupling to one of the elongated male drive shaft 17 and mating elongated female drive frame 19 of the spring-return clamping mechanism 12. The female drive frame 19 includes on a bottom surface thereof that is formed with the substantially rigid base plate 21 for being secured to a clamping mechanism of the type described, for example, in above incorporated U.S. Pat. No. 5,845,885. Manipulation of one of the ball-and-socket joints J of the external support structure S (illustrated in FIG. 1) permits the cradle apparatus 200 to be tilted at different angles, e.g., as indicated generally by the arrow 223, that may be more suitable for operation of the inserted device D.

Alternatively, as illustrated, the jaw structures 213, 214 are each formed as an integral part of the respective elongated male drive shaft 17 and mating female drive frame 19 of the spring-return clamping mechanism 12, for example as by injection molding. The spring-return clamping mechanism 12 is integrated with the jaw structures 213, 214 in an expandably contractible assembly structured for elastically urging the movable drive shaft-mounted jaw 213 against the relatively stationary drive frame-mounted jaw 214, as indicated by the arrow 225.

The interior clamping surfaces 226, 227 of the respective jaw structures 213, 214 are formed by respective clamping portions 228, 230 of the jaw structures 213, 214. The jaw structures 213, 214 and their respective included clamping portions 228, 230 are in substantially stationary arrangements adjacent to respective distal ends 215, 216 of the respective elongated male drive shaft 17 and mating female drive frame 19. The interior clamping surfaces 226, 227 formed on the included clamping portions 228, 230 of the respective jaw structures 213, 214 are generally structured for positively engaging opposite ends of a generally rectangular and flat-bottomed device D that is inserted therebetween. For example, jaw structures 213, 214 are mounted on the respective male drive shaft 17 and mating female drive frame 19, each having its respective interior clamping surface 226, 227 facing generally toward the interior clamping surface of the opposing jaw structure.

The movable and stationary jaws 213, 214 are structured for accommodating devices D within a range of different thickness dimensions T. As illustrated here by example and without limitation, the interior clamping surfaces 226, 227 project above the device mounting surfaces 124 of the respective male drive shaft 17 and mating female drive frame 19 for accommodating devices D of thicknesses T between a minimum and a maximum, where the minimum and maximum thicknesses T are typical for devices D of the type described herein currently available in the market. By example and without limitation, the stationary and movable jaw structures 213, 214 each have interior opening 140 that encompass the entire range of device thicknesses T between the device mounting surface 124 and distal extents of the interior clamping surfaces 226, 227.

By example and without limitation, the interior clamping surface 227 of the stationary jaw structure 214 is extended from an end wall 229 that is formed substantially perpendicular to the device mounting surface 124 of the female drive frame 19 adjacent to respective distal end 216 thereof. According to one embodiment of the present invention, the stationary jaw structure 214 includes an extension 231 therefrom projected generally toward the movable jaw structure 213. When the cradle apparatus 200 is tilted in the direction generally indicated by the arrow 223, as by manipulation of the ball-and-socket joint J when secured via the base plate 21 to a clamping mechanism of the type described, for example, in above incorporated U.S. Pat. No. 5,845,885, the stationary jaw structure 214 operates as a shelf for securing the device D against slipping along the device mounting surface 124, while the extension 231 secures the device D from falling away from the device mounting surface 124.

According to one embodiment of the invention, the interior clamping surface 226 of the movable jaw structure 213 nominally forms the angle b with the device mounting surface 124. The angle b of the clamping surface 226 is any angle between 0 and 90 degrees, inclusive. However, according to one embodiment of the invention, the angle b is any angle in the range between about 45 degrees and about 75 degrees, inclusive. According to another embodiment of the invention, the angle b is about 75 degrees, but according to other embodiments of the invention the angle b can optionally vary + or −15 degrees or more, from about 60 to 90 degrees.

The angularly inclined clamping surface 226 facing inwardly and downwardly toward the device mounting surfaces 124 permits the movable jaw structure 213 to engage the superior shoulder portion S2 on the upper edge of the inserted device D anywhere along the entire length of the inclined clamping surface 226 so that devices D having different thicknesses T are easily accommodated, without adjustments in the positions of the clamping surface 226 relative to the device mounting surface 124.

As indicated by the arrows, the spring-loaded clamping mechanism 12 urges the elastically biased movable jaw structure 213 to approach the relatively stationary jaw structure 214 along the longitudinal drive axis L of the spring-return clamping mechanism 12. Urging the elastically biased movable jaw structure 213 simultaneously urges the opposing clamping portion 228 and respective clamping surfaces 226, 227 to approach one another along the longitudinal drive axis L such that the angularly inclined clamping surface 226 press on the shoulder portion S2 of the of the inserted device D to compress the inserted device D toward the opposing clamping surface 227 and simultaneously downwardly toward the device mounting surface 124, as indicated by the arrow 232. The inserted device D is thereby captured between the opposing clamping surfaces 226, 227 and the device mounting surfaces 124.

The spring-return clamping mechanism 12 drives the jaw structures 213, 214 expandably together substantially along the common longitudinal drive axis L of the mating male drive shaft 17 and female drive frame 19 for forming mouth opening M of variable length between the opposing clamping surfaces 226, 227. The width of the mouth opening M between the opposing clamping surfaces 226, 227 is expanded to accommodate the width W of the device D inserted therebetween by forcing apart the movable male drive shaft 17 and relatively stationary female drive frame 19 along the common longitudinal drive axis L. The spring-return clamping mechanism 12 simultaneously urges the jaw structures 213, 214 back together for capturing and securing a device D inserted therebetween.

The jaw structures 213, 214 and their respective clamping surfaces 226, 227 are each optionally substantially symmetric relative to the common longitudinal drive axis L of the clamping mechanism 12.

According to one embodiment of the invention, at least a portion of the inclined clamping surface 226 is provided with a gripping portion 233 such as a plastic or rubber pad, coating or cover, that conforms the clamping surface 226 to the inserted device D. For example, the conforming pad, coating or cover 233 is semi-viscous having a high coefficient of friction relative to the material forming the jaw structure 213, which increases gripping of inserted device D. Alternatively, the gripping pad, coating or cover 233 is a gritty sandpaper or sandpaper-like substance having relatively high coefficient of friction. Additionally, the gripping pad, coating or cover 233 is slightly raised relative to the jaw structure 213 such that the clamping surface 226 is formed on top of the pad, coating or cover 233.

The male drive shaft 17 and mating female drive frame 19 are each optionally individually integrally formed of a substantially rigid and resilient material, such as a rigid metal, plastic, polycarbonate, or composite material. However, the jaw structure 214 of the male drive shaft 17 is made at least in part to be flexibly resilient, for example at a portion 235 is flexibly resilient between the device mounting surface 124 and the clamping portion 228 having inclined clamping surface 226. For example, at least the portion 235 and optionally the entirety of the jaw structure 213 is formed of a relatively thin section of the substantially rigid and resilient material as to be flexibly resilient to an outward pressure exerted on a portion of the jaw structure 213. Accordingly, the clamping portion 228 with inclined clamping surface 226 can be spread away from the opposing clamping surface 227 generally indicated by the arrow 237 by rotation relative to the device mounting surface 124 without movement of the male drive shaft 17 relative to the stationary female drive frame 19. According to one embodiment of the invention, the clamping portion 228 of the movable jaw structure 213 includes a thumb tab 239 at a distal end for applying the pressure for bending the jaw structure 213 and spreading the clamping portion 228 with the inclined clamping surface 226. When the thumb tab 239 is released, the flexibly resilient material of the male drive shaft 17 causes at least the portion 235 to operate as a spring to snap the jaw structure 213 back to its natural position with the clamping portion 228 having the clamping surface 226 inclined toward the device mounting surface 124 for exerting a clamping force Fc along the direction indicated by the arrow 232. The direction 232 of the clamping force Fc applied by the spring pressure of the flexibly resilient material causes the inclined clamping surface 226 to compress the inserted device D toward the opposing clamping surface 227 and simultaneously downwardly toward the device mounting surface 124. The inserted device D is thereby releasably captured between the opposing clamping surfaces 226, 227 and the device mounting surfaces 124.

Figure 8:
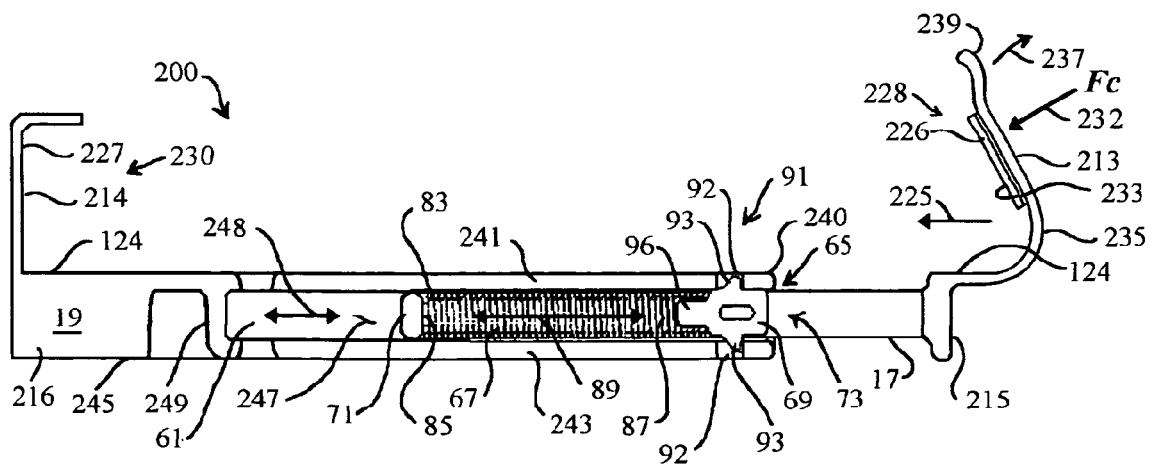
FIG. 8 is a cross-sectional view of the cradle apparatus of the present invention illustrated in FIG. 7 that illustrates one alternative embodiment of the spring-return clamping mechanism.

FIG. 8 is a cross-sectional view of the cradle apparatus 200 that illustrates one alternative embodiment of the spring-return clamping mechanism 12 which is taught by U.S. patent application Ser. No. 11/136,797 filed on May 24, 2005, in name of the inventor of the present invention, the complete disclosure of which is incorporated herein by reference. For example, the assembly of the expandably contractible spring-loaded clamping mechanism 12 arranged relative to the cradle apparatus 200 that is formed of the female drive frame 19 in combination with the mating male drive shaft 17. By example and without limitation, the drive shaft 17 is structured to move lengthwise within the closed-surface drive channel 61 that is structured along the common longitudinal drive axis L of the female drive frame 19 substantially parallel to the device mounting surface 124 thereof. By example and without limitation, an elastically compressible biasing member or compression spring 67 is constrained within the drive channel 61 between a foot portion 71 of the drive shaft 17 distal from the movable jaw structure 213 and the locking mechanism 65 of the invention. The locking mechanism 65 includes the locking structure 91 of the invention is embodied as the locking key 69 combined with both the male movable drive shaft 17 and female stationary drive frame 19. For example, the locking key 69 is coupled within the drive channel 61 adjacent to an end 240 of the female drive frame 19 proximate to the movable jaw structure 213 of the drive shaft 17.

By example and without limitation the drive channel 61 forms the spine of the female drive frame 19. As embodied in the illustrated example, the closed-surface of drive channel 61 is formed in by opposing interior and exterior channel walls 241, 243 that extend, by example and without limitation, substantially the entire length of the female drive frame 19. The interior channel wall 241 is formed with the device mounting surface 124 of the female drive frame 19 and is matched by opposing exterior channel wall 243 that forms the bottom face 245 of the female drive frame 19. The interior wall 241 is coupled to the opposing exterior channel wall 243 in a spaced-apart manner by a pair of spaced-apart opposing channel spacer walls 247 (one shown) intervening therebetween. At least the interior wall 241, exterior wall 241, and intervening walls 247 that form the closed-surface of channel 61, and optionally the entire structure of the female drive frame 19, are integrally formed of a substantially rigid and resilient material, such as a rigid metal, plastic or composite material, such that the closed-surface of channel 61 operates as a stiffener to rigidify the female drive frame 19. The intervening walls 247 are laterally offset on either side of the longitudinal drive axis L of the female drive frame 19, which will be well-understood by those of ordinary skill in the mechanical arts to add further stiffening to the female drive frame 19.

The closed-surface channel 61 includes a lengthwise open space 248 between the closed surface formed by the interior, exterior, and intervening walls 241, 243, 247. The open space 248 extends from the proximate end 240 opposite from the jaw structure 214 for substantially the entire length of the female drive frame 19 and thereby forms an open channel space within the interior of the closed-surface channel 61. The extended open space 248 is sized to admit the elongated rigid drive shaft 17 of the spring-loaded clamping mechanism 12 in sliding engagement for substantially the entire length of the closed-surface channel 61. Optionally, as embodied in the figures, the open space 248 extends substantially the entire length of the closed-surface channel 61 such that it includes the opening 73 into the open space 248 adjacent the to the proximate end 240 of the female drive frame 19. The channel 61 is optionally closed by an opposite second end 249 of the open space 248 adjacent to the distal end 216 of the female drive frame 19, and the open space 248 has a substantially constant cross-sectional interior configuration for substantially its entire length. Although possibly more difficult to manufacture, the channel 61 is optionally closed at its second end 249 (as shown).

The elastically compressible biasing member 67, which is illustrated by example and without limitation as a conventional coil-type compression spring of steel or another suitable material, is inserted between a distal end 215 of the drive shaft 17 adjacent to the jaw structure 213 and a foot portion 71 of the drive shaft 17 at a second end thereof distal from the jaw structure 213. The foot end 71 of the elongated drive shaft 17 is structured to engage and restrain one end 83 of the biasing spring 67. For ease of assembly, the distal foot end 71 of the elongated drive shaft 17 optionally includes the tab or nib 85 structured to engage and restrain the end 83 of the biasing spring 67.

After this assembly with biasing spring 67, the elongated drive shaft 17 is inserted into the closed-surface channel 61. The second foot end 71 of the elongated drive shaft 17 is inserted through into the open space 248 via the channel's opening 73 and slid toward the second opposite end 249 of the channel 61. The elongated drive shaft 17 is thereby slidingly engaged with the channel 61 formed between its interior, exterior, and intervening walls 241, 243, 247.

The biasing spring 67 is additionally compressed against the second distal foot end 71 of the movable clamp's elongated drive shaft 17 by pressure exerted against the biasing spring's free end 87. With the biasing spring 67 in a generally expanded condition having its restrained end 85 compressed against the distal foot end 71 of the elongated drive shaft 17 and captured within the closed-surface channel 61, the locking key 69 is installed between the free end 87 of the biasing spring 67 and the jaw structure 213 of the movable elongated drive shaft 17, and is mechanically coupled to the channel 61 at its first open end 240 near opening 73 into the open space 248. The biasing spring 67 is thereafter expandably compressed between the locking key 69 and distal foot end 71 of the movable clamp's elongated drive shaft 17. The biasing spring 67 thereafter exerts an expanding spring force F, illustrated by the arrow 89, between the locking key 69 and the distal foot end 71 of the elongated drive shaft 17 that results in a force that contracts or biases the jaw structure 213 of the movable drive shaft 17 toward the stationary jaw structure 214 of the cradle's female drive frame 19, as illustrated by the arrow 225. The biasing spring 67 thereby operates to expandably bias the movable jaw structure 213 toward the stationary jaw structure 214 for securing an inserted device D therebetween. The biasing spring 67 is selected having a spring rate sufficient to cause the movable drive shaft 17 to securely cradle the inserted device D against the cradle's stationary jaw structure 214.

According to the embodiment of the invention as illustrated here, at least one and optionally both (shown) of the interior and exterior channel walls 241, 243 are formed with respective opposing notches 92 into the channel open space 248 near to the opening 73 at the proximate end 240. The notch or notches 92 are structured to engage mating detents 93 on the locking key 69, whereby the locking key 69 is fixed in locked relationship with the channel 61 portion of the female drive frame 19. Thereafter, the closed-surface channel 61 and the locking key 69 together operate as a catch for the biasing member or compression spring 67 that spring-loads or "biases" the movable drive shaft 17 toward the cradle's stationary jaw structure 214 in a retractable or expandable manner. For ease of manufacturing the notches 92 are apertures formed completely through the respective channel walls 241, 243 (shown). The notches 92 are optionally closed indentations formed on opposing interior surfaces of the channel walls 241, 243. The detents 93 engage the opposing notches 92 to fix the locking key 69 in locked relationship with the female drive frame 19 and to capture the compression spring 67 within the channel 61 between the distal foot end 71 of the movable clamp's elongated drive shaft 17 and the first open end 240 of the channel 61 distal from the cradle's stationary jaw structure 214.

The locking key 69 is formed of a substantially incompressible material, for example metal or hard plastic, so that the detents 93 are stiff and unyielding. As discussed herein, the closed-surface of channel 61 is formed of a substantially rigid material, such as a metal, rigid plastic or composite material. The interior and exterior walls 241, 243 of the channel 61 are constructed having a width and thickness calculated to cooperate with the locking key 69 such that one or both of the channel walls 241, 243 flex slightly to admit the locking key 69 therebetween when sufficient pressure is applied to force locking key 69 through the opening 73 into the channel open space 248. As shown in FIG. 4, according to one embodiment of the invention, the detents 93 of the locking key 69 are each formed with a respective lead-in 94 for easing entry of the locking key 69 into the channel open space 248. The lead-ins 94 are, for example, a bevel or chamfer or a fillet (shown). As shown in FIG. 4, the opening 73 into the channel open space 248 may include lead-ins 98 that further ease entry of the locking key 69.

The locking key 69 includes a body 150 that is shaped to cooperate with the interior of the channel 61 and is sized to fit through the opening 73 into the open space 248 of channel 61 and thereafter become fixed in locked relationship with the notches 92 and thereby block the opening 73. For example, the key body 150 is substantially rectangular in cross-section when the channel 61 is formed with a rectangular cross-section. Optionally, the locking key 69 includes an integral tab or "nose" portion 96 that is structured to engage and capture the free end 87 of the biasing spring 67. The locking key 69 supports the biasing spring 67 in a partly compressed state when the biasing spring 67 is a conventional compression spring wound in a tubular shape along its active longitudinal axis, as illustrated. Thus, the nose 96 is sized to fit inside the tubular spring 67, while the key body 95 and shoulder 97 (shown in FIG. 4) are sized larger than the outer diameter of the tubular biasing spring 67. The nose 96 thereby provides purchase on the locking key body 95 during assembly that helps to maintain the relative positioning and alignment of the biasing spring 67 with the locking key body 95. Optionally, the nose 96 includes means for securing the biasing spring 67 relative to the locking key 69. For example, the nose 96 is formed with a cross-axis dimension, such as a diameter, sized to be a slight interference fit within the tubular coil-type biasing spring 67.

During assembly the key's nose 96 is fitted into the previously free end 87 of the tubular biasing spring 67. The locking key 69 is then pressed through the channel opening 73 into the open space 248 and between the walls 241, 243. The key's lead-ins 94 and channel opening's lead-ins 98 are used to ease entry of the locking key 69. The channel walls 241, 243 resiliently flex and spread apart to admit the key's detents 93 that extend from the key's body 95. The channel walls 241, 243 continue to flex and spread apart as the key 69 travels along the channel 61. The key's body 95 and nose 96 are further structured to cooperate with the channel walls 241, 243 and the biasing spring 67, respectively, to maintain alignment of the key 69 with the channel 61. When the key 69 is pushed far enough into the channel 61, the key's detents 93 encounter and enter the notches 92 in the channel walls 241, 243. Upon entry of the detents 93 into the cooperating notches 92 the substantially rigid and resiliently flexible interior and exterior channel walls 241, 243 resiliently revert or "snap back" to their natural shape, whereby the key's detents 93 are nested and substantially permanently captured in the cooperating notches 92. The biasing spring 67 is thereby permanently captured within the channel 61 between the foot end 71 of the clamp's elongated drive shaft 17 and the first open end 240 of the channel 61 distal from the stationary frame's jaw structure 214.

Figure 9:
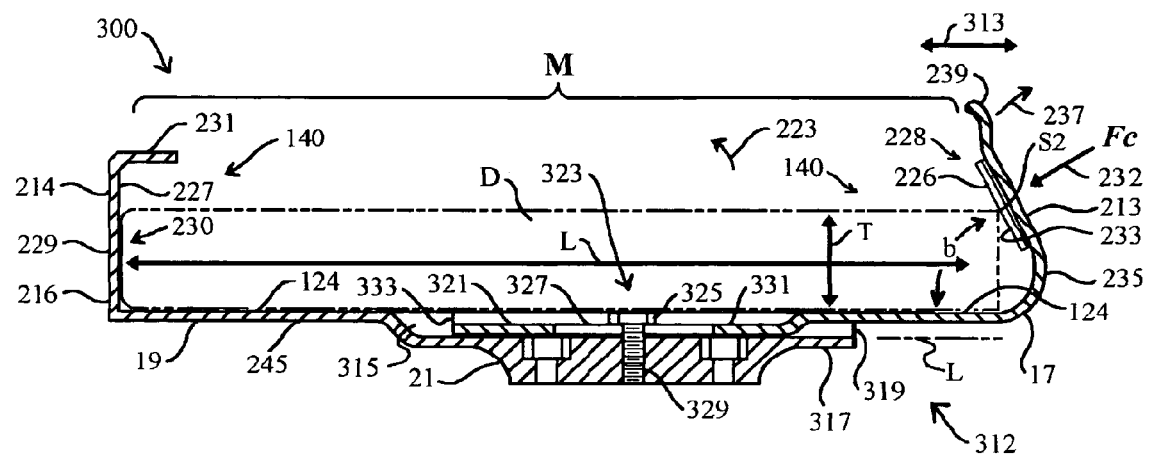
FIG. 9 is a side cross-sectional view that illustrates another alternative releasably-clamped universal cradle apparatus of the present invention.

FIG. 9 is a side cross-sectional view that illustrates the present invention embodied as another alternative releasably-clamped universal cradle apparatus 300 wherein the movable male drive shaft 17 and the stationary female drive frame 19 are both formed of a thin sheet of substantially rigid and resilient material, such as hard plastic, polycarbonate, metal, or composite material. Additionally, the length of the mouth opening M between the opposing interior clamping surfaces 226, 227 of the respective jaw structures 213, 214 is substantially permanently adjustable without the spring-return clamping mechanism 12 of previously described embodiments. Rather, according to this alternative embodiment of the present invention, the spring-return clamping mechanism 12 is replaced with a permanently securable slide mechanism 312 that permits the movable male drive shaft 17 to be positionally adjusted relative to the stationary female drive frame 19 along the common longitudinal drive axis L, as indicated by the arrow 313, and then substantially permanently locked in the new relative position. By example and without limitation, the stationary female drive frame 19 is formed with a groove or channel 315 aligned along the common longitudinal drive axis L below the frame's device mounting surface 124. The channel 315 is optionally open toward the frame's device mounting surface 124, as illustrated, or closed. The channel 315 is optionally provided with a closed floor 317 formed on the bottom face 245 of the female drive frame 19. For example, the channel 315 is formed as a depression in the device mounting surface 124 of the female drive frame 19 with a pair of spaced-apart opposing channel spacer walls 319 (one shown) intervening between the closed floor 317 and the frame's device mounting surface 124. The channel 315 thus forms a shallow dustpan or shovel shape in the female drive frame 19. As will be generally understood, the shovel shape serves to stiffen the female drive frame 19 against flexing. Alternatively, the bottom face 245 of the female drive frame 19 is formed with two or more of the grooves or channels 315 aligned along the common longitudinal drive axis L below the frame's device mounting surface 124.

According to one embodiment of the present invention, the closed bottom floor 317 of the groove 315 includes is formed with the substantially rigid base plate 21 for being secured to a clamping mechanism of the type described, for example, in above incorporated U.S. Pat. No. 5,845,885.

The movable male drive shaft 17 is formed with a mating tongue 321 that is aligned along the common longitudinal drive axis L below the drive shaft's device mounting surface 124. The mating tongue 321 is structured to cooperate with the channel 315 for moving the jaw structures 213, 214 together and apart by moving the male drive shaft 17 toward and away from the mating female drive frame 19 along the common longitudinal drive axis L. The jaw structures 213, 214 are secured in a selected relative relationship that fixes the length of the mouth opening M between the opposing interior clamping surfaces 226, 227. For example, a securing mechanism 323 is interconnected between the channel 315 of the female drive frame 19 and the mating tongue 321 of the male drive shaft 17. According to one embodiment of the present invention, the securing mechanism 323 is provided by a threaded fastener 325 through an aperture 327 formed through the tongue 321 in combination with a mating threaded hole 329 formed in the female drive frame 19, for example, into or through the base plate 21.

According to one embodiment of the present invention, the aperture 327 is a lengthwise slot aligned along the longitudinal drive axis L that permits the male drive shaft 17 to be moved in a fixed range of positions relative to the female drive frame 19. The slotted aperture 327 thereby permits adjustment of the relative relationship between the jaw structures 213, 214 before securing them in a selected relationship that fixes the length of the mouth opening M between the opposing interior clamping surfaces 226, 227. Alternatively, the aperture 327 is formed as multiple apertures all aligned along the longitudinal drive axis L, and the threaded fastener 325 is moved between the mating threaded hole 329 and different apertures 327 for adjusting the relative relationship of the jaw structures 213, 214.

According to one embodiment of the present invention, the mating tongue 321 of the male drive shaft 17 is formed in another shallow dustpan or shovel shape that cooperates with the shape in the female drive frame 19 to keep the fastener 325 below the device mounting surfaces 124. For example, the tongue 321 is formed as a depression in the device mounting surface 124 of the male drive shaft 17, the depression having a floor 331 that is spaced below the device mounting surfaces 124 sufficiently to provide clearance above the fastener 325 when it is tighten securely with the mating threaded hole 329. The depression may also include a pair of spaced-apart opposing channel spacer walls 333 (one shown) intervening between the floor 331 and the drive shaft's device mounting surface 124. The channel 315 thus forms the shallow dustpan or shovel shape in the male drive shaft 17 that cooperates with the shape formed in the female drive frame 19. As will be generally understood, the shovel shape serves to stiffen the male drive shaft 17 against flexing. As will also be generally understood, the male drive shaft 17 is formed with multiple tongues 321 when the female drive frame 19 is formed with two or more of the grooves or channels 315. As will also be generally understood, the slotted aperture 327 is optionally formed with banks along its lengthwise edges that are inclined to match a standard countersink screw so that the fastener 325 is flush or completely below the mounting surfaces 124 when mated with the threaded hole 329. When the aperture 327 is formed as a plurality of such apertures, each aperture 327 is formed with a countersink to match the countersink fastener 325, whereby the depressed shovel shape of the tongue 321 may be eliminated. Accordingly, the mating male drive shaft 17 and female drive frame 19 can be adjusted to adjust the length the mouth opening M between the opposing clamping surfaces 226, 227 to accommodate the width W of the device D inserted therebetween. Then the selected relative relationship male drive shaft 17 and female drive frame 19 is secured using the securing mechanism 323 to interlock the overlapping portions of the drive shaft 17 and drive frame 19.

As discussed above, the jaw structure 213 of the male drive shaft 17 is integrally formed of a substantially rigid and resilient material, such as a rigid metal, plastic, polycarbonate, or composite material to be at least in part to be flexibly resilient, for example the portion 235 is flexibly resilient between the device mounting surface 124 and the clamping portion 228 having the inclined clamping surface 226. For example, at least the portion 235 and optionally the entirety of the jaw structure 213 and male drive shaft 17 are formed of a relatively thin section of the substantially rigid and resilient material as to be flexibly resilient to an outward pressure exerted on a portion of the jaw structure 213. Accordingly, after the mouth opening M between the opposing interior clamping surfaces 226, 227 is selected and the selected relative relationship male drive shaft 17 and female drive frame 19 is secured using the securing mechanism 323, the clamping portion 228 and inclined clamping surface 226 can be spread away from the opposing clamping surface 227 as generally indicated by the arrow 237 by rotation relative to the device mounting surface 124 without movement of the male drive shaft 17 relative to the stationary female drive frame 19. According to one embodiment of the invention, the clamping portion 228 of the movable jaw structure 213 includes the thumb tab 239 at a distal end for applying the pressure for bending the jaw structure 214 and spreading the clamping portion 228 with the inclined clamping surface 226. As discussed above, when the thumb tab 239 is released, the flexibly resilient material of the male drive shaft 17 causes at least the portion 235 to operate as a spring to snap the jaw structure 213 back to its natural position with the clamping portion 228 having its clamping surface 226 inclined toward the device mounting surface 124 for exerting a clamping force Fc along the direction indicated by the arrow 232. The direction 232 of the clamping force Fc applied by the spring pressure of the flexibly resilient material causes the inclined clamping surface 226 to compress the inserted device D toward the opposing clamping surface 227 and simultaneously downwardly toward the device mounting surface 124. The inserted device D is thereby releasably captured between the opposing clamping surfaces 226, 227 and the device mounting surfaces 124.

Figure 10:
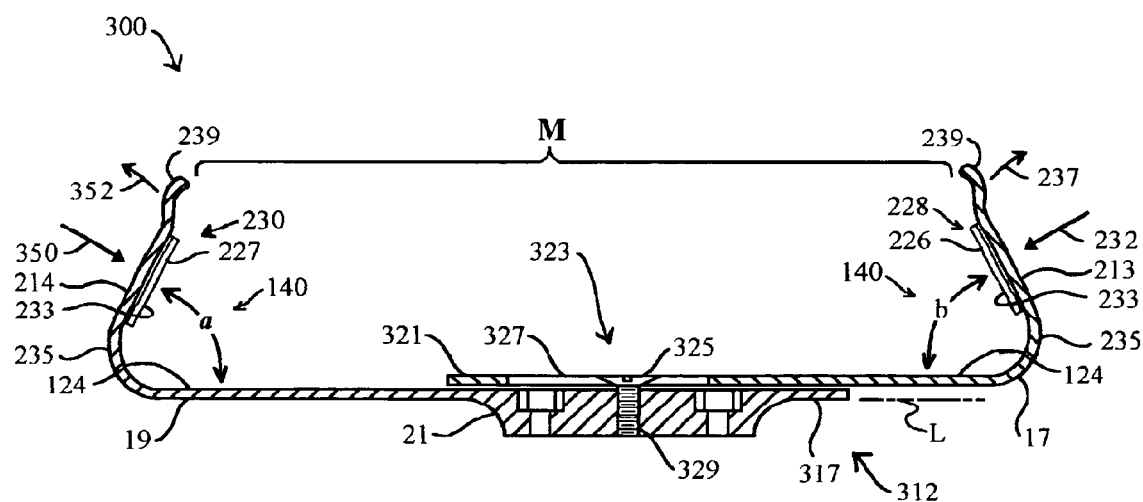
FIG. 10 illustrates one alternative embodiment of the releasably-clamped universal cradle apparatus illustrated in FIG. 9 wherein a channel in the female drive frame is eliminated.

FIG. 10 illustrates one alternative embodiment of the releasably-clamped universal cradle apparatus 300 wherein the channel 315 in the female drive frame 19 is eliminated. Accordingly, the floor 317 is merely an extension of the of the frame 19, and the device mounting surface 124 is continued substantially the entire length of the drive frame 19. According to this embodiment, the mating tongue 321 is merely an extension of the male drive shaft 17 so that the device mounting surface 124 is continued substantially the entire length of the drive shaft 17. Accordingly, the thin sheet of the male drive shaft 17 merely overlays a portion of the length of the frame 19 such that the respective device mounting surfaces 124 are left slightly offset.

As illustrated here, the inclined clamping surface 227 on the jaw structure 214 of the frame 19 is also formed inclined toward the device mounting surface 124 at the included angle a, where the angles a and b may be substantially identical. Optionally, the frame 19 also includes the flexibly resilient portion 235 between the inclined clamping surface 227 and the device mounting surfaces 124 for exerting the clamping force Fc along the direction indicated by the arrow 350. The direction 350 of the clamping force Fc applied by the spring pressure of the flexibly resilient material causes the inclined clamping surface 227 to compress the inserted device D toward the opposing inclined clamping surface 226 and simultaneously downwardly toward the device mounting surface 124. The inserted device D is thereby releasably captured between the opposing clamping surfaces 226, 227 and the device mounting surfaces 124.

The female drive frame 19 may optionally be formed of the flexibly resilient material similarly to the male drive shaft 17. Accordingly, the clamping portion 230 of the stationary jaw structure 214 with its included inclined clamping surface 227 can be spread away from the opposing inclined clamping surface 226 as generally indicated by the arrow 352 by rotation relative to the device mounting surface 124, without movement of the male drive shaft 17 relative to the stationary female drive frame 19. According to one embodiment of the invention, the stationary jaw structure 214 includes the thumb tab 239 at a distal end for applying the pressure for bending the jaw structure 214 and spreading the clamping portion 230 with the inclined clamping surface 227. When the thumb tab 239 is released, the flexibly resilient material of the female drive frame 19 causes at least the portion 235 to operate as a spring to snap the clamping portion 230 of the jaw structure 214 back to its natural position having the clamping surface 227 inclined toward the device mounting surface 124 for exerting a clamping force Fc along the direction indicated by the arrow 350. The direction 350 of the clamping force Fc applied by the spring pressure of the flexibly resilient material causes the clamping portion 230 and inclined clamping surface 227 to compress the inserted device D toward the opposing inclined clamping surface 226 and simultaneously downwardly toward the device mounting surface 124.

FIG. 11 is a side view that illustrates one embodiment of a clamp member 351 of the present invention that is similar to the type described by the inventor of the present invention in U.S. Pat. No. 6,585,212 for "Quick release electronics platform" issued Jul. 1, 2003, the complete disclosure of which is incorporated herein by reference. Accordingly, the clamp member 351 is an elongated finger having a base portion 353 with a mounting surface 355 and the clamping portion 228 formed as a crooked jaw portion 357 extending therefrom. The jaw portion 357 includes a curved neck portion 359 extending from the base portion 353 into a short and substantially straight clamping portion 361 having the inclined clamping surface 226 formed as facet thereof. The straight clamping portion 361 is formed at an appropriate obtuse angle 363 to the base portion 353. The angle 363 is about 135 degrees according to one embodiment of the invention, but according to other embodiments of the invention can optionally vary + or −15 degrees or more. When the clamp member 351 is installed on an end face 365 of the male drive shaft 17 as illustrated in FIG. 12, the jaw portion 357 extends above the respective device mounting surface 104. The angle 363 positions the short clamping portion 361 of the jaw portion 357 with the inclined clamping surface 226 facing inwardly and downwardly toward the respective device mounting surface 104 of the male drive shaft 17. The angle 363 permits the movable jaw structure 213 to engage the superior shoulder portion S2 on the upper edge of the inserted device D along the entire length of the inclined clamping surface 226 so that different inserted devices D of different ranges of thicknesses T are easily accommodated, without adjustments in the positions of the clamp members 351 relative to the device mounting surface 104. The clamp member 351 includes the thumb tab 239 at a distal end thereof for applying the pressure for bending the jaw structure 214 and spreading the inclined clamping surface 226.

The inclined clamping surface 226 includes a gripping portion 367 having a contact surface 369 with a relatively high coefficient of friction so that the clamping surface 226 grips the edge of the accessory device D, rather than just compressing it into the device mounting surfaces 104. For example, the high friction gripping portion 367 is a pad of material having a relatively high coefficient of friction, such as a thin sheet of rubber or conventional non-skid material adhered to the inclined clamping surface 226. Optionally, the high friction gripping portion 367 is formed with a grooved, knurled, serrated, slotted, or otherwise suitably roughened surface area in place of the rubber sheet or non-skid material.

According to one embodiment of the invention, the high friction gripping portion 367 is embodied as a resilient cushion or pressure pad formed of an elastomeric material, such as rubber or a synthetic substitute. The resilient gripping portion 367 is formed having a thickness and durometer that permits it to be compressed against the edge of the inserted device D while remaining elastic. The resilient gripping portion 367 thus operates as a spring compressed between the clamping surface 226 and the inserted device D to maintain a substantial spring pressure against the inserted device D. This spring pressure operates to press the press the accessory device against the device mounting surfaces 104, thereby further limiting slippage of the device resulting from any jarring experienced, for example, during motion of a vehicle having an apparatus of the present invention mounted therein. The contact surface 369 is optionally structured to grip the inserted device D, rather than just compressing it into the device mounting surfaces 104. For example, the high friction contact surface 369 is formed with a grooved, knurled, serrated, slotted, or otherwise suitably roughened surface area or is covered with a thin sheet of rubber or another non-skid material, as discussed in U.S. Pat. No. 6,585,212, which is incorporated herein.

Optionally, the mounting surface 355 of the base portion 353 of each clamp member 351 includes a relatively high friction surface, such as a grooved, knurled, diamond, serrated, slotted, or otherwise suitably roughened surface area, that is configured to cooperate with a high friction surface area formed on the end face 365 to eliminate slippage of the clamp member 351 relative to the male drive shaft 17. According to one embodiment of the invention, the high friction mounting surface 355 is a grooved surface when the cooperating high friction surface area on the end face 365 of the male drive shaft 17 grooved surfaces.

Additionally, each clamp member 351 optionally includes a stiffener portion 371 extending along part or all of its length for strengthening the clamp member 351 in a plane in which the clamping surface 226 acts which is generally crosswise to the device mounting surface 124 and generally aligned with the apparatus longitudinal drive axis L.

Optionally, a threaded stud 373 is extended from the mounting surface 355 of the base portion 353 for mounting the clamp member 351 to the end face 365 of the male drive shaft 17, as illustrated in FIG. 12.

FIG. 12 is a side cross-sectional view that illustrates the present invention embodied as another alternative releasably-clamped universal cradle apparatus 400 wherein the movable male drive shaft 17 and the stationary female drive frame 19 are each formed of a thin sheet of substantially rigid and resilient material, such as hard plastic, polycarbonate, metal, or composite material. Additionally, the length of the mouth opening M between the opposing interior clamping surfaces 226, 227 on the respective clamping portions 228, 230 of the respective jaw structures 213, 214 is substantially permanently adjustable generally as illustrated in either FIG. 9 or 10. Here, the male drive shaft 17 is integrally formed of the substantially rigid and resilient material to be at least in part to be flexibly resilient, for example the portion 235 is flexibly resilient between the device mounting surface 124 and the clamping portion 228 having inclined clamping surface 226. Here, the movable jaw structure 213 having the clamping portion 228 with its inclined clamping surface 226 is optionally formed separately from the male drive shaft 17. Rather, the distal end 215 of the elongated male drive shaft 17 is structured to mount the separately formed jaw structure 213 thereto by means of a securing mechanism 402. For example, the securing mechanism 402 is provided by the threaded stud 373 that is extended from the mounting surface 355 of the clamp member 351, which is passed through an aperture 404 formed through the distal end 215 of the elongated male drive shaft 17 and engaged with a mating threaded nut 406. Optionally, a washer 408, such as any flat, spring or locking washer, is inserted between the threaded stud 373 and the mating threaded nut 406.

According to one embodiment of the present invention, the aperture 404 is a lengthwise slot aligned with the longitudinal drive axis L of the male drive shaft 17 that permits the clamp member 351 to be moved in a fixed range of positions along the end face 365 of the male drive shaft 17. Movement of the clamp member 351 along the end face 365 results in movement of the clamping portion 228 and inclined clamping surface 226 relative to the device mounting surfaces 124. The slotted aperture 404 thereby permits selective adjustment of the relative relationship between the inclined clamping surface 226 and the device mounting surfaces 124 before securing them in a fixed relationship that determines the range of thicknesses T of inserted devices D that can be accommodated. Alternatively, the aperture 404 is formed as multiple apertures all aligned with the longitudinal drive axis L, and the threaded stud 373 or other fastener is moved between the different apertures 404 for adjusting the relative relationship of the inclined clamping surface 226 to the device mounting surfaces 124.

With the clamp member 351 installed on an end face 365 of the male drive shaft 17, the jaw portion 357 extends above the device mounting surface 104. The angle 363 (shown in FIG. 11) positions the short clamping portion 361 of the jaw portion 357 with the inclined clamping surface 226 facing inwardly and downwardly toward the respective device mounting surface 104. The angle 363 permits the movable jaw structure 213 to engage the superior shoulder portion S2 on the upper edge of the inserted device D along any portion of the entire length of the inclined clamping surface 226 so that different inserted devices D of different ranges of thicknesses T are easily accommodated, without adjustments in the positions of the clamp members 351 relative to the device mounting surface 104. Pressure applied to the thumb tab 239 at the distal end of the clamp member 351 causes the male drive shaft 17 to bend, at least in the flexibly resilient portion 235. The male drive shaft 17 is optionally flexible along its entire length such that it flexes substantially all along an entire length 410 thereof that is not engaged with the female drive frame 19. Bending of the male drive shaft 17 causes the jaw structure 213 and spreading the clamping portion 228 and inclined clamping surface 226. Accordingly, the inclined clamping surface 226 can be spread away from the device mounting surface 104 and the opposing clamping surface 227 generally indicated by the arrow 237 by rotation relative to the device mounting surface 124 without movement of the male drive shaft 17 relative to the stationary female drive frame 19. When the thumb tab 239 is released, the flexibly resilient material of the male drive shaft 17 causes at least the portion 235 and optionally, the entire unengaged length 410 thereof, to operate as a spring to snap the jaw structure 213 back to its natural position having the clamping surface 226 inclined toward the device mounting surface 124 for exerting a clamping force Fc along the direction indicated by the arrow 232. The direction 232 of the clamping force Fc applied by the spring pressure of the flexibly resilient material causes the inclined clamping surface 226 to compress the inserted device D toward the opposing clamping surface 227 and simultaneously downwardly toward the device mounting surface 124. The inserted device D is thereby releasably captured between the opposing clamping surfaces 226, 227 and the device mounting surfaces 124.

As discussed above, the optional ability to move the clamp member 351 relative to the end face 365 of the male drive shaft 17 accommodates inserted devices D having a wider range of thicknesses T.

Additionally, a second independent clamp member 351 of the present invention is optionally substituted for the stationary jaw structure 214 at the distal end 216 of the female drive frame 19 for providing the clamping portion 230 with its included inclined clamping surface 227 spaced above the device mounting surfaces 124 opposite from the inclined surface 226 formed on the first clamp member 351.

Figure 13:
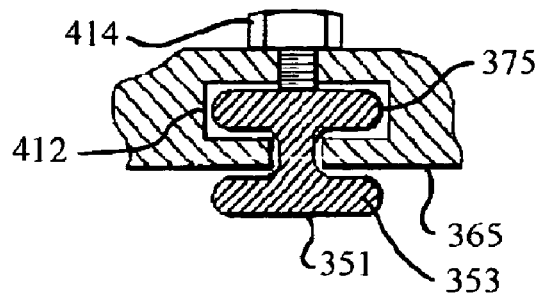
FIG. 13 shows a bottom end view of an alternative clamp member of the present invention having a tongue-and-groove structure for mating with an end face of the male drive shaft.

FIG. 13 shows a bottom end view of the clamp member 351 alternatively embodied using a tongue-and-groove structure for mating with the end face 365 of the male drive shaft 17. For example, the base portion 353 of the clamp member 351 is formed with an optional T-shaped flange 375 for joining with a cooperating slot structure 412 formed in the end face 365. Reaction pressure provided by the inserted devices D acting against the inclined clamping surface 226 causes the base portion 353 of the clamp member 351 to jam in the cooperating slot structure 412 for maintaining the selected position relative to the end face 365 of the male drive shaft 17. Optionally, a set screw 414 or other clamping mechanism is used to fix the base portion 353 of the clamp member 351 in the cooperating slot structure 412, however, this is expected to be unnecessary. The clamp member 351 is thus capable of movement, i.e., adjustment, relative to the device mounting surfaces 124 for accommodating inserted devices D having a wider range of thicknesses T.

Figure 14:
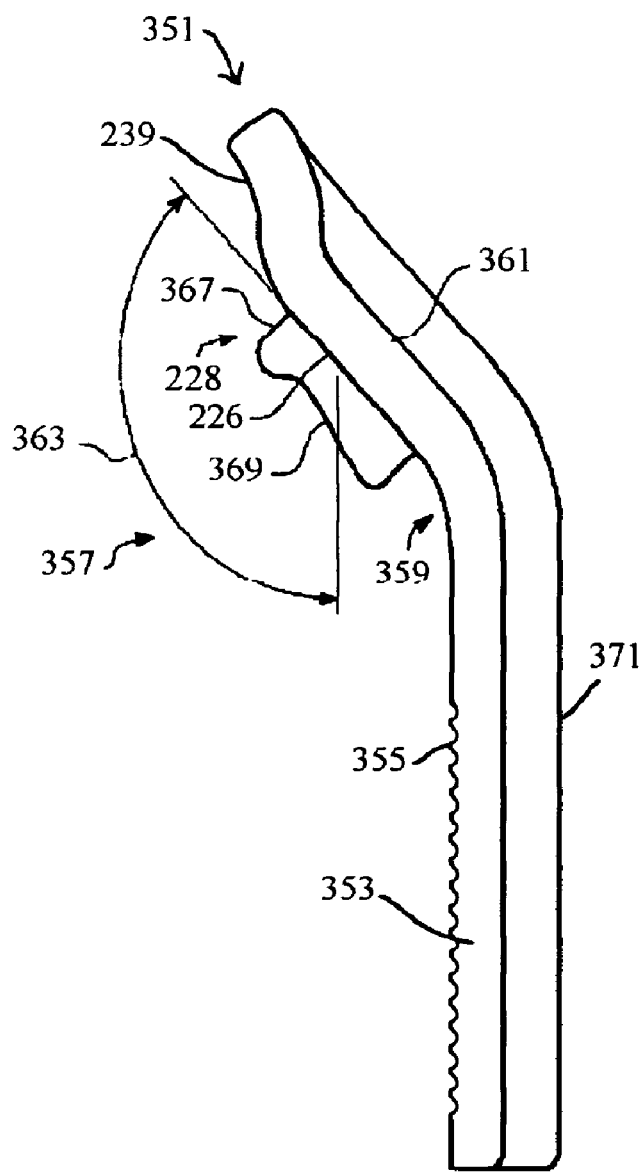
FIGS. 14 and 15 are side and front views, respectively, that illustrate yet another an alternative clamp member of the present invention.
Figure 15:
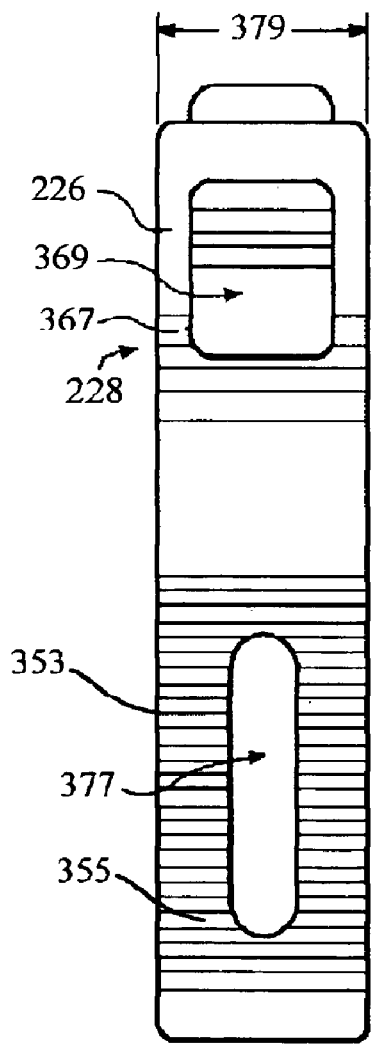

FIGS. 14 and 15 are side and front views, respectively, that illustrate the clamp member 351 alternatively embodied having an aperture 377 formed through the base portion 353 and sized to accept a separate fastener, for example the set screw 414, for fixing the clamp member 351 to the end face 365 of the male drive shaft 17.

Optionally, the separate fastener, such as the set screw 414 is passed both through the aperture 377 in the base portion 353 and through the aperture 404 formed in the end face 365 of the male drive shaft 17. The aperture 377 is optionally embodied as a slot aligned with the length of the base portion 353 so that the clamp member 351 can be moved relative to the distal end 215 of the elongated male drive shaft 17 along the end face 365. The jaw portion 357 is thus spaced further away from or closer to the device mounting surfaces 124.

FIG. 14 shows the clamp member 351 embodied in a simpler shape having the curved neck portion 359 of the clamping portion 228 formed as a simple bend between the base portion 353 and the short substantially straight clamping portion 361 of the jaw portion 357, but is otherwise substantially as described above. The single bend neck portion 359 is formed at the appropriate obtuse angle 363, which is again about 135 degrees according to one embodiment of the invention. The short clamping portion 361 of the jaw portion 357 is positioned by the angle 363 to face inwardly and downwardly toward the device mounting surfaces 124, and permits the jaw portion 357 to engage inserted devices D of different thicknesses T, without adjustments in the positions of the clamp members 351 relative to the device mounting surfaces 124.

FIG. 15 shows the high friction mounting surface 355 of the base portion 353 as a grooved surface that is interrupted by the slot 377. The clamp member 351 is optionally formed with a width 379 that can be as to merely accommodate a single slot 377 or T-shaped flange 375 and a minimal amount of material on either side thereof. However, the invention also contemplates a clamp member 351 having an optionally greater width 379 that, for example, is contiguous with a large portion or substantially all of the width of the end face 365 of the male drive shaft 17 and accommodates multiple slots 377 or T-shaped flanges 375. Thus, all such optional structures are considered to be equivalents of the clamp member 351 of the invention.

While the preferred embodiment of the invention has been illustrated and described, it will be appreciated that various changes can be made therein without departing from the spirit and scope of the invention. For example, any of the features of the various embodiments disclosed herein may be interchanged with the features of other embodiments and combined with the different embodiments described herein without departing from the spirit and scope of the invention. Therefore, the inventor makes the following claims.

What is claimed is:

1. A universal cradle apparatus, comprising:
 a telescoping clamping mechanism, comprising:
   (i) a drive frame and a cooperating drive shaft coupled to the drive frame in a relatively movable relationship therewith along a common axis,
   (ii) a fastener coupled between the drive frame and the drive shaft and substantially permanently interlocking the drive shaft in a fixed position relative to the drive frame along the common axis, and
   (iii) one of the drive frame and the drive shaft being structured for being secured to an external mounting surface;
 first and second mounting surfaces each positioned on a respective one of the drive frame and the drive shaft; and
 a first jaw structure coupled to the drive frame and a second jaw structure coupled to the drive shaft, the first and second jaw structures being projected above the respective mounting surfaces of the drive frame and the drive shaft, and each of the jaw structures having a respective clamping surface formed thereon and forming mutually opposing interior clamping surfaces arranged adjacent to the mounting surfaces positioned therebetween.

2. The apparatus of claim 1 wherein the clamping surface on the second jaw structure is further inclined toward the respective mounting surface.

3. The apparatus of claim 2, further comprising a resiliently flexible structure between the inclined clamping surface of the second jaw structure and the respective mounting surface.

4. The apparatus of claim 3 wherein the second jaw structure further comprises a gripping portion positioned on the inclined clamping surface thereof.

5. The apparatus of claim 3 wherein the resiliently flexible structure between the inclined clamping surface and the respective mounting surface further comprises a portion of the respective one of the drive frame and the drive shaft.

6. The apparatus of claim 3 wherein the second jaw structure further comprises a substantially rigid jaw structure mechanically attached to the respective one of the drive frame and the drive shaft, the inclined clamping surface being formed as a facet of the second jaw portion.

7. The apparatus of claim 1 wherein the second jaw structure is further resiliently biased toward the respective mounting surface substantially independently of the respective one of the drive frame and the drive shaft.

8. A universal cradle apparatus, comprising:
 a telescoping clamping mechanism, comprising first and second cooperating clamp structures;
 a fastener coupled between the first and second cooperating clamp structures for fixedly interlocking the first and second clamp structures in one of a plurality of substantially permanently relatively immovable interconnected relationships substantially aligned along a common operational axis;
 first and second device mounting surfaces formed respectively on the first and second clamp structures in a substantially parallel relationship with the common operational axis;
 a first jaw structure positioned on the first clamp structure and having a first clamping portion formed with a first interior clamping surface projected above and facing generally toward the first and second device mounting surfaces;
 a resiliently flexible second jaw structure positioned on the second clamp structure and having a second clamping portion formed with a second interior clamping surface spaced above the first and second device mounting surfaces and inclined generally toward the first interior clamping surface and the first and second device mounting surfaces; and
 a means for mounting the apparatus to an external surface being positioned on one of the first and second clamp structures opposite from the device mounting surface thereof.

9. The apparatus of claim 8 wherein the plurality of interconnected relationships further comprise a substantially continuous series of the interconnected relationships substantially aligned along the common operational axis.

10. The apparatus of claim 8 wherein the second interior clamping surface is further resiliently biased toward the second device mounting surface.

11. The apparatus of claim 10 wherein the second clamping portion of the second jaw structure is further coupled to the second device mounting surface by a resiliently flexible portion interposed there between.

12. The apparatus of claim 11 wherein the second clamping portion of the second jaw structure is further substantially continuously integral with the second device mounting surface and the resiliently flexible portion there between.

13. The apparatus of claim 11 wherein the second jaw structure further comprises a clamp member formed having a base portion with a mounting surface on one face thereof and the second clamping portion extending at an angle therefrom on a curved neck portion, the mounting surface of the base portion being coupled to the second device mounting surface through the resiliently flexible portion.

14. The apparatus of claim 8, fhrther comprising a cooperating channel and mating tongue interposed between the first and second cooperating clamp structures, the tongue mating with the channel along the common axis.

15. A universal cradle apparatus, comprising:
 first and second opposing jaw structures each having a base flange formed with a substantially planar device mounting surface and an interior clamping surface formed on a respective clamping portion thereof that is spaced above the device mounting surface, the interior clamping surface of one of the first and second jaw structures being resiliently flexible and biased toward the device mounting surface and further being inclined toward the device mounting surface at an angle between about forty-five degrees and about ninety degrees;
 a telescoping clamping mechanism formed of a frame member and cooperating drive shaft extending along a common operational axis and being interconnected by an interlock that is substantially permanently fixedly coupled there between and further comprising a threaded fastener coupled between the frame member and cooperating drive shaft, each of the frame member and cooperating drive shaft including a different one of the first and second jaw structures adjacent to an end thereof distal from the opposing jaw structure and forming a forming a mouth opening of interlockably fixable variable length between the opposing interior clamping surfaces with the respective device mounting surface therebetween in a substantially parallel relationship; and
 a substantially rigid base plate positioned on one of the frame member and cooperating drive shaft opposite from the device mounting surface thereof, the base plate being structured for being coupled to an external surface.

16. The apparatus of claim 15, further comprising a resiliently flexible portion between the inclined interior clamping surface and the device mounting surface.

17. The apparatus of claim 16 wherein the frame member and cooperating drive shaft further comprise a cooperating channel and mating tongue, the mating tongue being moveable relative to the channel along the common operational axis.

18. The apparatus of claim 17 wherein the mating tongue is further continuously moveable within a range.

19. The apparatus of claim 16 wherein the one of the first and second jaw structures inclined clamping surface further comprises a base portion with a mounting surface on one face thereof and the clamping portion extending at an angle therefrom on a curved neck portion, the mounting surface of the base portion being coupled to the resiliently flexible portion.

20. The apparatus of claim 16 wherein the interior clamping surface formed on the respective clamping portion of each of the first and second opposing jaw structures is further inclined toward the device mounting surface at an angle between about forty-five degrees and about ninety degrees.

* * * * *